Jan. 20, 1970 G. H. KASPER 3,490,846

OPTICAL ALIGNMENT AND EXPOSURE APPARATUS

Filed June 1, 1967 14 Sheets-Sheet 1

*INVENTOR.*

GOETZ H. KASPER

BY *Gregg & Stidham*

ATTORNEYS

OPTICAL ALIGNMENT AND EXPOSURE APPARATUS

Filed June 1, 1967 14 Sheets-Sheet 2

INVENTOR.
GOETZ H. KASPER

BY Gregg & Stidham
ATTORNEYS

Jan. 20, 1970 G. H. KASPER 3,490,846

OPTICAL ALIGNMENT AND EXPOSURE APPARATUS

Filed June 1, 1967 14 Sheets-Sheet 3

INVENTOR.
GOETZ H. KASPER

BY Gregg & Stidham

ATTORNEYS

Jan. 20, 1970 G. H. KASPER 3,490,846

OPTICAL ALIGNMENT AND EXPOSURE APPARATUS

Filed June 1, 1967 14 Sheets-Sheet 4

INVENTOR.
GOETZ H. KASPER

BY Gregg & Stidham
ATTORNEYS

INVENTOR.
GOETZ H. KASPER

BY Gregg & Stidham
ATTORNEYS

OPTICAL ALIGNMENT AND EXPOSURE APPARATUS

Filed June 1, 1967 14 Sheets-Sheet 6

INVENTOR.
GOETZ H. KASPER

BY Gregg & Stidham
ATTORNEYS

Jan. 20, 1970 G. H. KASPER 3,490,846

OPTICAL ALIGNMENT AND EXPOSURE APPARATUS

Filed June 1, 1967 14 Sheets-Sheet 7

INVENTOR.
GOETZ H. KASPER

BY Gregg & Stidham
ATTORNEYS

INVENTOR.
GOETZ H. KASPER

BY Gregg & Stidham
ATTORNEYS

INVENTOR.
GOETZ H. KASPER

BY Gregg & Stidham
ATTORNEYS

Jan. 20, 1970 G. H. KASPER 3,490,846

OPTICAL ALIGNMENT AND EXPOSURE APPARATUS

Filed June 1, 1967 14 Sheets-Sheet 10

INVENTOR.
GOETZ H. KASPER

BY Gregg & Stidham
ATTORNEYS

Jan. 20, 1970 G. H. KASPER 3,490,846

OPTICAL ALIGNMENT AND EXPOSURE APPARATUS

Filed June 1, 1967 14 Sheets-Sheet 11

INVENTOR.
GOETZ H. KASPER

BY Gregg & Stidham
ATTORNEYS

INVENTOR.
GOETZ H. KASPER

BY Gregg & Stidham
ATTORNEYS

Jan. 20, 1970 G. H. KASPER 3,490,846

OPTICAL ALIGNMENT AND EXPOSURE APPARATUS

Filed June 1, 1967 14 Sheets-Sheet 13

INVENTOR.
GOETZ H. KASPER

BY Gregg & Stidham
ATTORNEYS

OPTICAL ALIGNMENT AND EXPOSURE APPARATUS

INVENTOR.
GOETZ H. KASPER

BY Gregg & Stidham
ATTORNEYS

United States Patent Office 3,490,846
Patented Jan. 20, 1970

3,490,846
OPTICAL ALIGNMENT AND EXPOSURE APPARATUS

Goetz H. Kasper, Santa Clara, Calif., assignor to Kasper Instruments, Inc., Santa Clara, Calif., a corporation of California Filed June 1, 1967, Ser. No. 642,895
Int. Cl. G03b 27/02; G02b 21/00, 23/00
U.S. Cl. 355—78 47 Claims

ABSTRACT OF THE DISCLOSURE

A wafer chuck and a mask holder are movable as a unit to bring a semiconductor wafer and a mask into the optical field of a microscope and are movable relative to one another to bring the wafer and the mask into optical alignment without moving the eyepiece lens system of the microscope. An actuating mechanism for relatively moving the wafer chuck and the mask holder includes a lever having a pair of spaced fulcrums to provide different mechanical advantages for fine and coarse alignment adjustments. A stop mechanism associated with the wafer chuck automatically spaces the wafer a fixed distance from the mask during alignment. The microscope includes a turret for rotating either a single field or an adjustable split field objective lens system into registration with the stationary eyepiece lens system during alignment of the wafer and the mask and for subsequently rotating a mirror into position for directing a light beam to expose a photosensitive film on the wafer through the mask.

This invention relates to an optical alignment instrument for use in the fabrication of semiconductors and more particularly to an optical instrument for alignment of a mask and wafer during the masking process, and for exposing the wafer through the mask.

Transistors, integrated circuits, and the like may be fabricated from thin semiconductor wafers. Various steps involved in the processing of the wafers include the growth of an oxide on a wafer of n- or p-type semiconductor material, coating of the oxide layer with a photo resist, exposing the photosensitive film to light through a high resolution mask, developing and then etching the oxide layer to expose the semiconductor material, diffusing an impurity such as boron into the exposed semiconductor, and removing of the developed photo resist. A new oxide film is grown on the wafer (or formed during the diffusion cycle) and the above-mentioned steps of coating with photo resist, etc., are repeated using, however, a mask with a different pattern thereon. Such steps are repeated as often as required for the formation of the desired circuitry. After the circuits are formed, the wafer is scribed and separated into individual circuits which are packaged or mounted for use in electrical apparatus. Often, over four hundred individual circuits are formed on a single wafer.

During the masking steps a key pattern is formed on the wafer and a cooperating pattern is provided on the masks to facilitate alignment of the wafer and such masks. The apparatus of this invention is used for accurately aligning the mask and wafer in the masking process and for exposing the wafer to an ultraviolet light when so aligned.

An object of this invention is the provision of an optical alignment tool by means of which rapid and accurate alignment of a wafer and mask are possible with minimum operator fatigue.

An object of this invention is the provision of an optical alignment instrument which includes a novel wafer loading arrangement for rapidly and accurately loading the wafers on a chuck included in the instrument.

An object of this invention is the provision of means for automatically unloading the wafer from the chuck and returning the same to a loading tray following exposure of the wafer through the mask.

An object of this invention is the provision of a mask holder for use in an optical alignment instrument whereby a mask is easily and simply detachably secured to the holder for rapid replacement of masks.

An object of this invention is the provision of a chuck holding mechanism for automatically spacing the wafer a predetermined spaced distance from the mask during the alignment function of the instrument regardless of variations in the thickness of the wafer.

An object of this invention is the provision of a low friction bearing arrangement for reciprocably mounting a pair of relatively movable members such as stages upon which a wafer chuck and mask are mounted in an optical alignment instrument.

An object of this invention is the provision of an optical alignment instrument which includes a novel wafer chuck and mask mounting arrangement by means of which the wafer chuck and mask mounting are movable together as a unit to bring the same into the optical field of the microscope, and which includes means for relatively moving the mask holder and wafer chuck to bring the same into optical alignment while the microscope remains stationary.

An object of this invention is the provision of a microscope for use in an optical alignment instrument comprising a stationary eyepiece and a rotary turret which carries at least one split field objective lens system and a novel split field lens adjusting means diagonally opposite therefrom.

An object of this invention is the provision of a novel actuating arrangement which includes a lever with first and second fulcrums at spaced distances therealong which are selectively employed to provide the arrangement with first and second mechanical advantages for fine and coarse adjustment. The fine adjustment also is adjustable for the desired mechanical advantage.

The instrument comprises a base unit, which carries a mask holder and wafer chuck, and an optical unit pivotally attached to the base unit. The optical unit carries a light system for illuminating and exposing the wafer, and a microscope for viewing the same. The optical unit normally is in a lowered position, and is pivoted to a raised position for access to the mask holder for removal and replacement of the mask.

The microscope comprises a stationary binocular eyepiece lens system of substantially conventional design, and a novel objective lens system carried by a rotary turret. The turret has a plurality of stations including a single field objective lens arrangement, at least one split field objective lens arrangement, and a first surface mirror for directing light from an ultraviolet light source onto the wafer to expose the photosensitive layer thereon through the mask. Tungsten light sources are available for illumination of the wafer during the alignment procedure. Since the eyepiece lens system remains stationary during the alignment procedure, there is no necessity for movement of the operator's head to follow moving eyepieces during the alignment process.

The operative objective lens system on the turret is that which is at the rearwardmost position, and an indication of the turret position is provided by indicia viewable by the operator through an opening at the front of the instrument. The split field objective lenses are provided with a novel adjusting mechanism extending from the turret at a point diagonally opposite the same whereby the spacing of the lenses is simply adjustable from the front of the instrument at a position readily accessible to the operator.

The wafer chuck and mask holder are mounted on first and second stages which are movable together by actuation of a first control means to position the wafer for viewing of the key pattern, or patterns thereon. The stages are also relatively movable for aligning the mask and wafer patterns. Low friction rod and ball bearing members of novel design are employed in the stage mountings.

The actuating mechanism for moving the two stages together includes a lever arrangement in which the lever is pivotable about a fixed pivot point. The actuating mechanism for the relative movement of the first and second stages includes a gimbal and lever arrangement, which arrangement is carried by the first stage for movement therewith when the first lever is actuated. The lever of the second arrangement is pivotable about either a first or second pivot point for coarse and fine adjustment, and control means for selecting the pivot point are provided for readily selecting the fine and coarse adjustment positions.

The mask holder is pivotally attached to the instrument, and is provided with a vacuum chuck for holding the mask in a fixed position thereon. A switch is actuated by the mask holder in the open position for control of the vacuum to the mask chuck. By simply swinging the mask holder to the fully open condition, the vacuum to the mask chuck holder is removed for release of the mask. The vacuum is reapplied to the mask holder upon initial movement of the mask holder toward the closed position to hold the same firmly in position thereon.

The wafers to be processed may be contained on a rotatable tray, from which they are removed for loading onto the wafer chuck by a loading slide. The wafer is carried from the loading slide to a vacuum type chuck, which draws the wafer into engagement therewith. The loading slide then is returned to the retracted position. Novel stop means are provided on the chuck for providing the same spacing between the mask and wafer during the aligning process for wafers of different thickness whereby refocusing of the microscope is not required from one wafer to another once the microscope has been properly focused.

The chuck is mounted on a ball joint whereby the wafer is brought into parallel relation with the mask by first engaging the wafer with the mask. The wafer chuck is then automatically retracted a predetermined distance to provide for the constant mask and wafer separation during the alignment procedure. When the mask and wafer are brought into alignment the wafer chuck is again raised to bring the wafer into engagement with the mask. When properly aligned, the turret in the optical head is rotated for deflection of light from the ultraviolet light source onto the wafer.

Following exposure, the wafer chuck is automatically returned to the retracted position, the chuck vacuum is automatically released, and the exposed wafer is pushed off the chuck and back onto the tray. During the exposure process the head of the loading slide may be loaded with an unexposed wafer in preparation for loading after the exposed wafer is ejected.

The above and other objects and advantages of the invention will become apparent from the following description taken in conjunction with the drawings. In the drawings, wherein like reference characters refer to the same parts in the several views.

Figure 1:
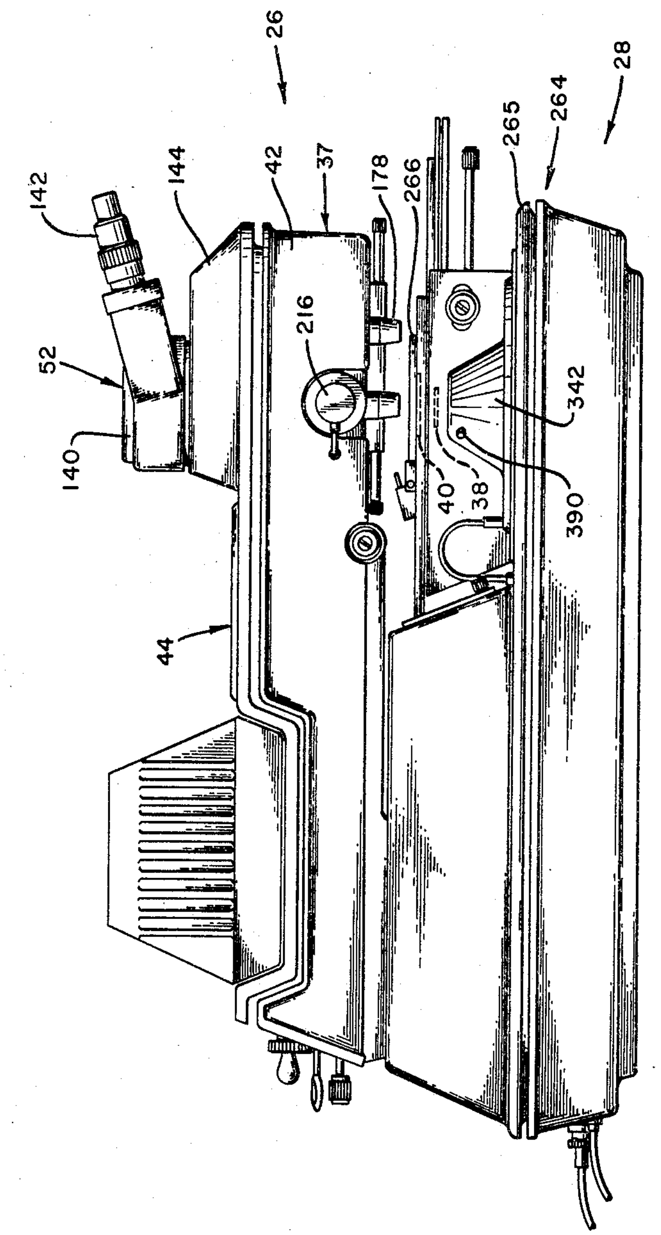
FIGURE 1 is a side elevational view of an optical alignment and exposure instrument embodying this invention.
Figure 2:
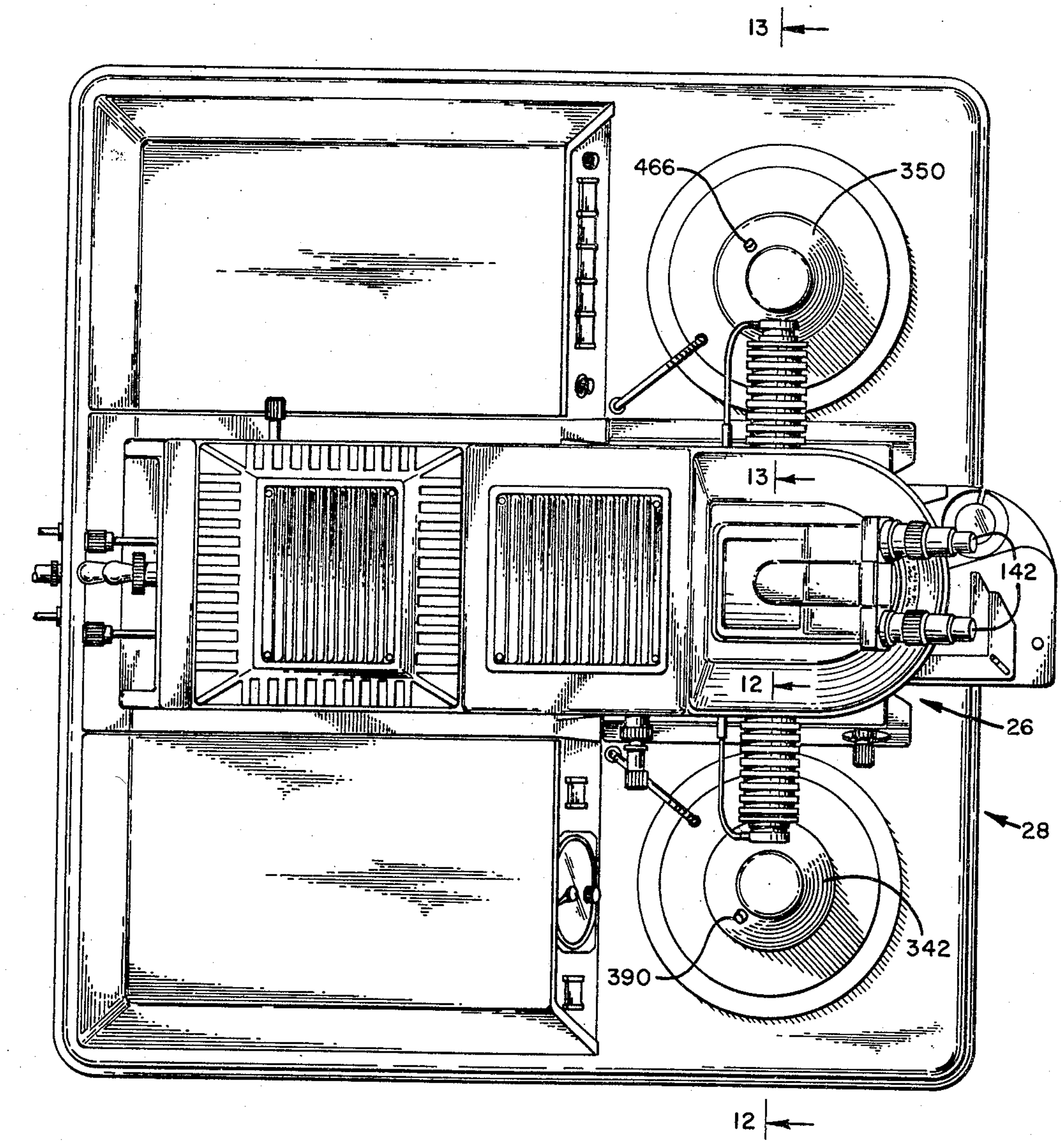
FIGURE 2 is a plan view of the instrument shown in FIGURE 1.
Figure 3:
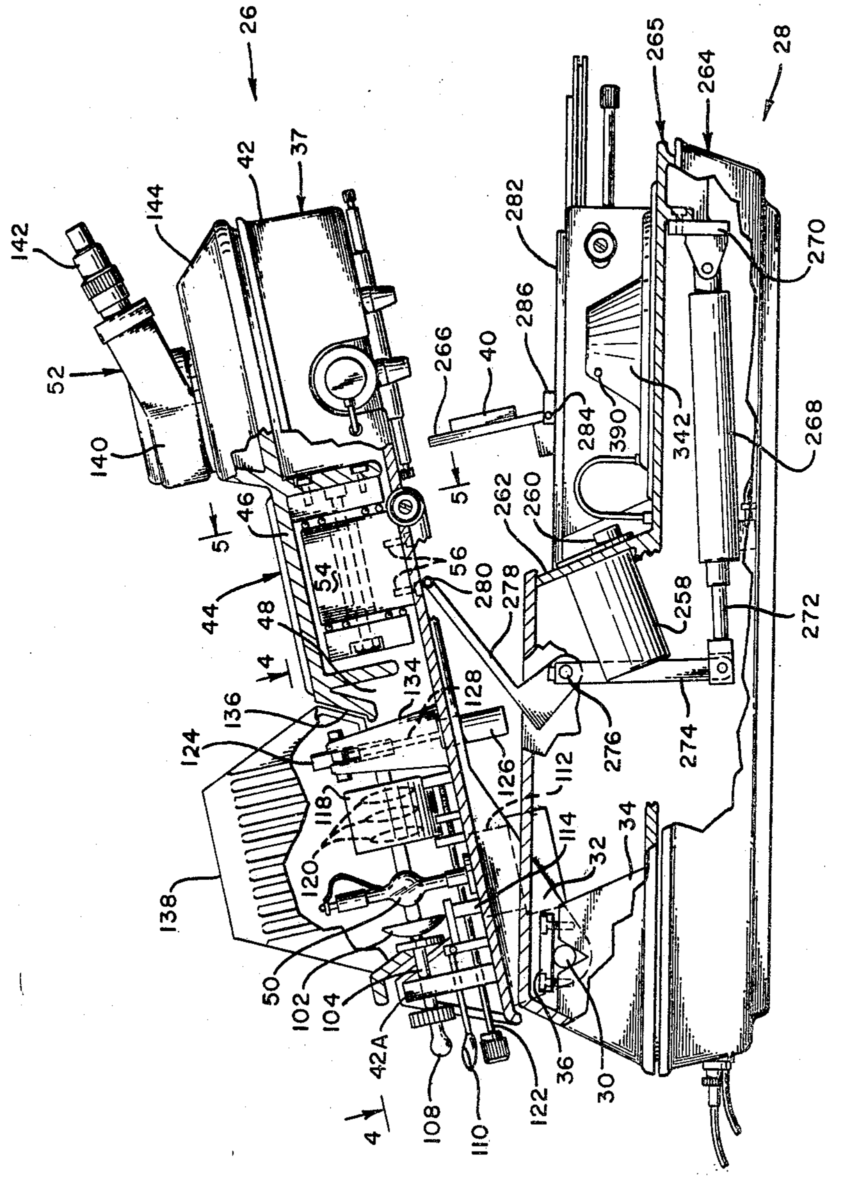
FIGURE 3 is a side elevational view which is similar to FIGURE 1 but showing parts of the instrument broken away for clarity.

Reference is now made to FIGURES 1, 2 and 3 wherein the optical alignment and exposure instrument of this invention is shown comprising an optical section or unit 26 pivotally secured to a base section or unit 28. As best seen in FIGURE 3, pivotal connection between the units 26 and 28 is provided by a rod 30 supported by brackets 32 extending downwardly from the optical unit, which rod is pivotally carried in aligned V-grooves formed in upwardly extending brackets 34 on the base unit. Keepers 36 attached to the top of the brackets 34 maintain the rod 30 in the grooves. In FIGURE 3 only one of the brackets 32 or 34, and one keeper 36 are shown. Obviously, other suitable means for pivotally connecting the base and optical units may be employed.

The base unit 28 is adapted to carry a workpiece which, in the illustrated arrangement, comprises a photosensitized semiconductor wafer, and a high resolution mask through which the wafer is exposed, the wafer and mask being shown in broken lines in FIGURE 1 and identified by reference numerals 38 and 40, respectively. The base unit 28 includes novel mechanism whereby an operator may accurately and precisely align the wafer and mask. The optical unit 26 includes a microscope for viewing the wafer and mask (when the unit is in the lowered position as shown in FIGURE 1), a light source, or sources, for illuminating the mask and wafer while viewing the same during the alignment operation, and a light source for exposing the photosensitized material when the wafer and mask are in alignment.

The optical unit 26 includes a housing comprising a dish shaped base member 37 having a generally flat bottom 39 with generally upright walls 42. (See FIGURES 3, 5, 6 and 7.) The base member 37 of the optical unit 26 is provided with a cover 44 of a generally inverted dish shape having a top wall 46 and generally downward extending side walls 48 which extend inside the side walls 42 of the base member 37 to prevent light leakage therefrom.

Figure 6:
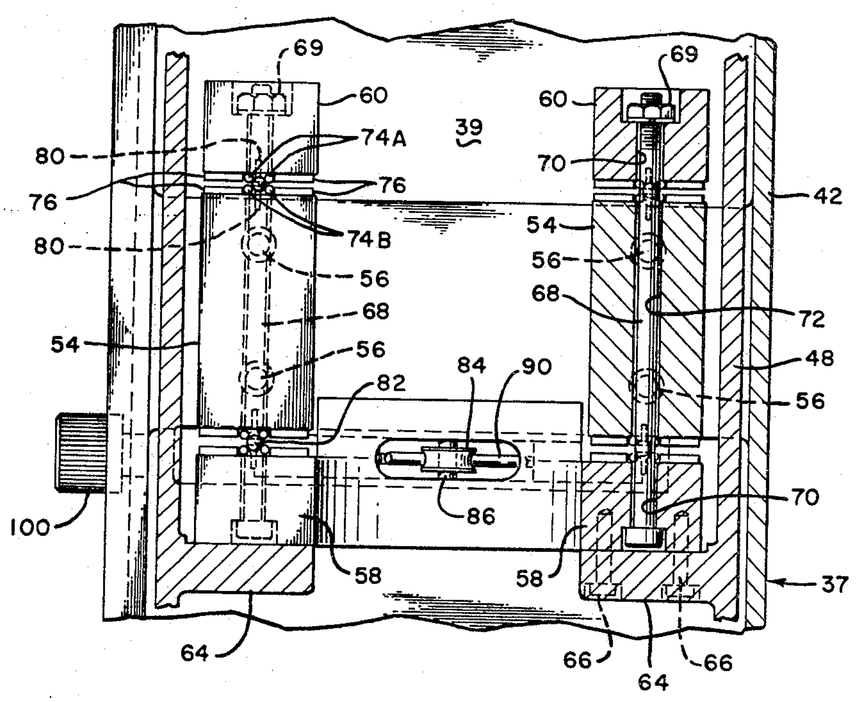
FIGURE 6 is a fragmentary sectional view taken along line 6—6 of FIGURE 5.
Figure 5:
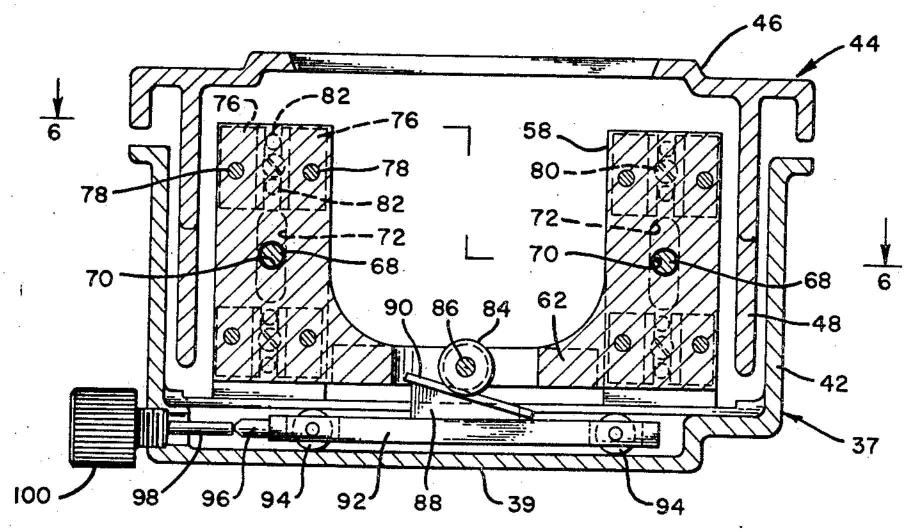
FIGURE 5 is a transverse cross-sectional view through the optical section taken on line 5—5 of FIGURE 3.

As seen in FIGURE 3, a source of ultraviolet light such as a mercury vapor lamp 50, with associated light beam forming elements described in further detail hereinbelow, is mounted on the base member 37, and a microscope 52 is mounted on the cover 44. The cover 44 is vertically movable with respect to the base member 37 for vertical adjustment of the point of impingement of the beam from the lamp 50 onto the microscope. The vertically adjustable mounting arrangement for securing the cover 44 to the base 37 is generally centrally located between the forward and rear ends of the optical unit and includes upwardly extending bearing blocks 54 attached as by machine screws 56 to the bottom 39 of the base member. (See FIGURES 3 and 6.) As seen in FIGURE 6, the blocks are laterally spaced from the longitudinal axis of the optical head along which longitudinal axis the light beam from the lamp 50 passes.

Slides 58 and 60 are provided at opposite ends of bearing blocks 54 and are adapted for vertical movement therealong. If desired, the slides 58 may be integrally formed in a generally U-shaped structure as viewed in FIGURE 5, with the slides comprising parallel upright arms which are interconnected by a base portion 62 extending therebetween at the lower end of the arms. The slides 58 at the forward end of the bearing blocks 54 are attached to inwardly directed flanges 64 formed on the cover 44 as by screws 66 which extend through holes in the flanges and threadedly engage the slides 58. The slides 60 at the rear end of the bearing blocks 54 are independently formed and are connected to the forward slides 58 by bolts 68 which extend into holes 70 in the slides 58 and 60 and through elongated holes 72 in the bearing blocks 54. The slides are vertically adjustable along the bearing blocks by adjustment means described hereinbelow. First, however, a novel low friction mounting arrangement between the slides and bearing blocks will be described.

The slide mounting includes a plurality of bearing arrangements of the same construction whereby a description of only one is sufficient. Each bearing arrangement comprises a first pair of spaced parallel rod members 74A secured to a slide (58 or 60) and a second pair of spaced parallel extending rod members 74B (which may be the same as the first pair but which are provided with different reference characters for purposes of description) secured to the bearing blocks 54 opposite said first pair. Securing means for the rods include abutment blocks 76 which are attached by screws 78 to the slides and bearing blocks. (See FIGURE 5.) Headed fasteners such as machine screws 80 threadedly engage the slides and bearing blocks between the rods 74A and 74B, which screws have heads with generally conical shaped inner surfaces for engagement with the rods. When the screws are tightened the rods are tightly wedged against the rod abutment blocks and associated slide or bearing block. One or more ball bearing members 82 are positioned between the two pairs of rods and are adapted for rolling engagement therewith. In the illustrated arrangement two ball bearing members are provided at each bearing arrangement and may be maintained in position therebetween by a suitable cage, not shown. The rods may be of cylindrical-shape, as shown, or may be formed with a longitudinally extending flat, or flats, which abut the abutment block 76 and/or slide or bearing block, as desired. The balls 82 engage the cylindrical portion of the rods for rolling engagement therealong. The novel bearing arrangement is easily constructed and rugged, and yet reduces friction between the slides or blocks to a minimum. In the illustrated arrangement, adjustment of the contact pressure between the bearing elements is provided by tightening and loosening of the nuts 69 on the bolts 68 which hold the slides to the bearing blocks.

The weight of the slides together with the weight of the cover 44 and apparatus carried thereby urges the slides downwardly. A cam follower 84 seen in FIGURES 5 and 6, in the form of a roller with an axial groove in the outer face thereof is rotatably supported on a pin 86 extending between the side walls of an aperture formed in the connecting base portion 62 of the forward slides 58, which roller engages a rod 90 secured to the edge of a cam 88 in the form of an inclined plate. The cam plate 88 is attached to a carriage 92 having wheels 94 for travel across the bottom 39 of the base 37. One end of the carriage 92 has a pointed rod 96 extending therefrom which engages a push rod 98. A rotatable knob 100 connects to the push rod 98 through a threaded coupling, not shown, for axial adjustment of the push rod. The coupling may be of the type used in instruments such as micrometers, or the like, and requires no detail showing. A graduated scale may be associated with the knob 100 to permit a reading of the push rod position. It will be seen that the push rod 98 comprises an adjustable stop for the carriage 92. By moving the rod to the right as viewed in FIGURE 6 the slides and attached cover 44 are raised, and by moving the rod to the left the slides and cover are lowered by reason of their own weight and the weight of the apparatus carried thereby.

Figure 4:
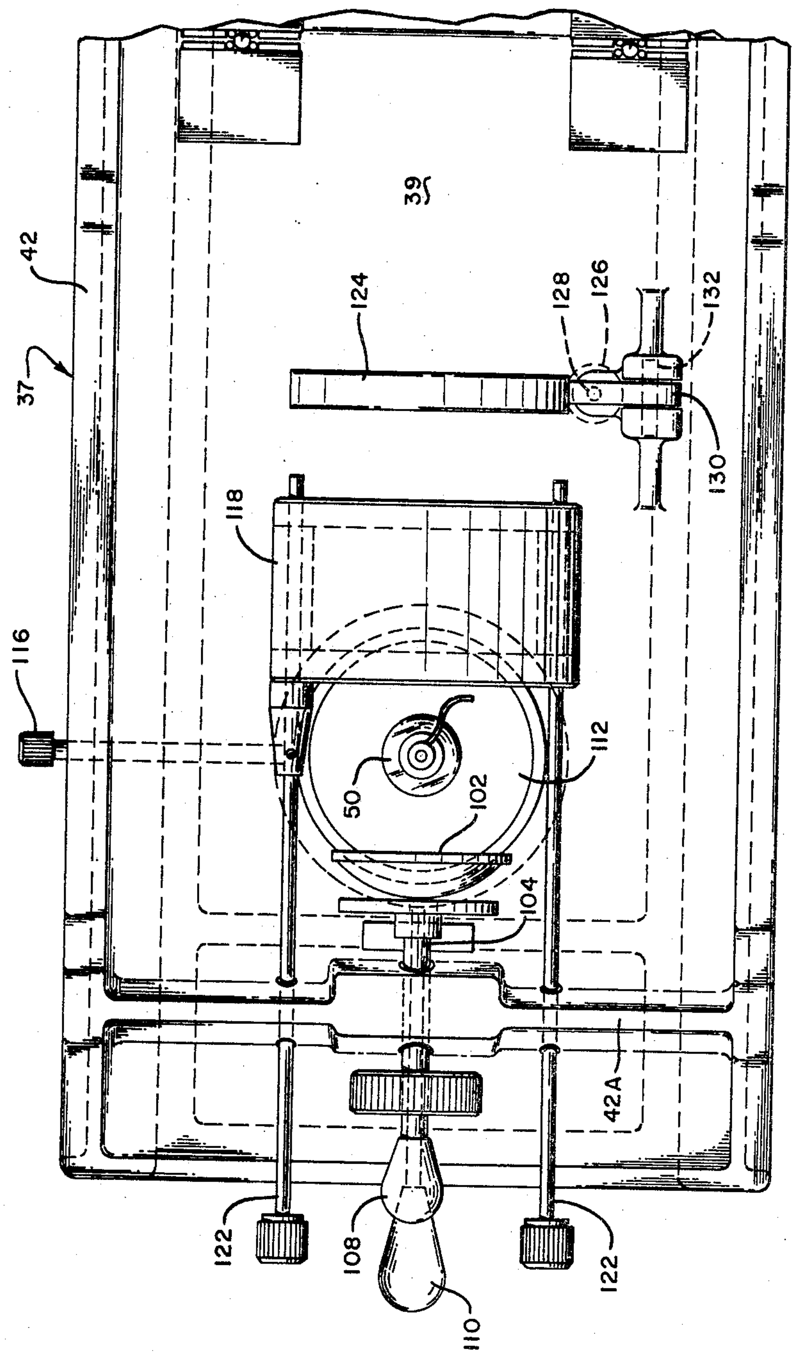
FIGURE 4 is a fragmentary plan view taken along line 4—4 of FIGURE 3 and showing the instrument with the lamp cover removed therefrom.

With the novel arrangement of this invention a source of ultraviolet light is provided for exposure of the light sensitive film on the wafer after the wafer and mask are brought into proper alignment. The lamp 50 shown in FIGURES 3 and 4 comprises a mercury vapor lamp, or the like, which provides a source of illumination which includes light in the ultraviolet spectrum. A concave mirror 102 is mounted at one end of a rod 104 extending through and movably carried by the rear wall, designated 42A of the housing 37. The mirror 102 is adjustably located by manual actuation of the handle 108 at the outer end of the rod for proper focusing of the light from the lamp.

The lamp 50 also is adjustably positioned by means of an operating lever 110 which is connected to the lamp mounting 112 through suitable linkage 114 of conventional design. (See FIGURE 3.) A locking screw 116 (see FIGURE 4) extending from the side of the housing 37 serves to lock the lamp mounting in the desired adjusted position.

Light from the lamp 50 is directed through a tubular-shaped lens housing 118 containing one or more lenses 120. The housing 118 is mounted adjacent the inner ends of rods 122 which extend through the wall 42A and are slidably mounted therewith. Consequently, adjustment of the lens housing 118 along the path of the light beam from the lamp reflector 102 is possible by manual pushing or pulling movement of the rods 122 for proper focusing of the light beam at the wafer. Various mechanisms for adjustment of the lamp, reflector and lens are well known and a detailed showing thereof is believed not to be required.

In addition to providing the ultraviolet light for exposure of the light sensitive film on the wafer, the lamp 50 also may be used for illuminating the wafer and mask during alignment of the wafer and mask by filtering out the ultraviolet light during such use. To this end there is provided a filter 124 which is movable into and out of the path of the beam of light from the lamp 50. With the filter in the light path the ultraviolet rays are filtered therefrom. This filtered beam may be directed to the wafer to illuminate the same in the manner described below. With the filter removed from the light path the ultraviolet rays may be directed onto the wafer to expose the sensitized layer thereon.

Movement of the filter 124 between operative and inoperative positions is under control of fluid cylinder 126 attached to the bottom plate 39 of the base member 37. (See FIGURES 3 and 4). A piston rod 128 extends from the cylinder, and the upper end of the piston rod is pivotally attached to an arm 130 to which the filter is attached. The outer end of the arm 130 is attached by a pivot pin 132 to a bifurcated bracket 134 extending upwardly from the base 39. In the illustrated unpressurized condition of the cylinder 126 the lens 124 is located in the light path to filter out the ultraviolet rays therefrom. When the cylinder is pressurized, the filter is pivoted upwardly out of the path of the beam. When the unfiltered beam is directed onto the wafer, in the manner described below, the wafer is exposed through the mask. The ultraviolet lamp 50 and associated beam forming apparatus is accessible through an opening 136 (see FIGURE 3) formed in the top 46 of the cover 44, which opening is normally closed by a cover 138 having louvered openings in the walls thereof for the passage of air for cooling, but through which openings light is prevented from passing.

As mentioned above, the microscope 52 for viewing the wafer and mask is located at the forward end of the pivotal optical section 26 and includes an ocular head 140 with binocular type eyepieces 142. Eyepieces of well known design such as those employed in conventional binocular-type microscopes, or like instruments, may be employed, and for this reason details of the various lenses, mirrors, prisms and the like included in the binocular eyepiece head are not shown.

Figures 7, 8:
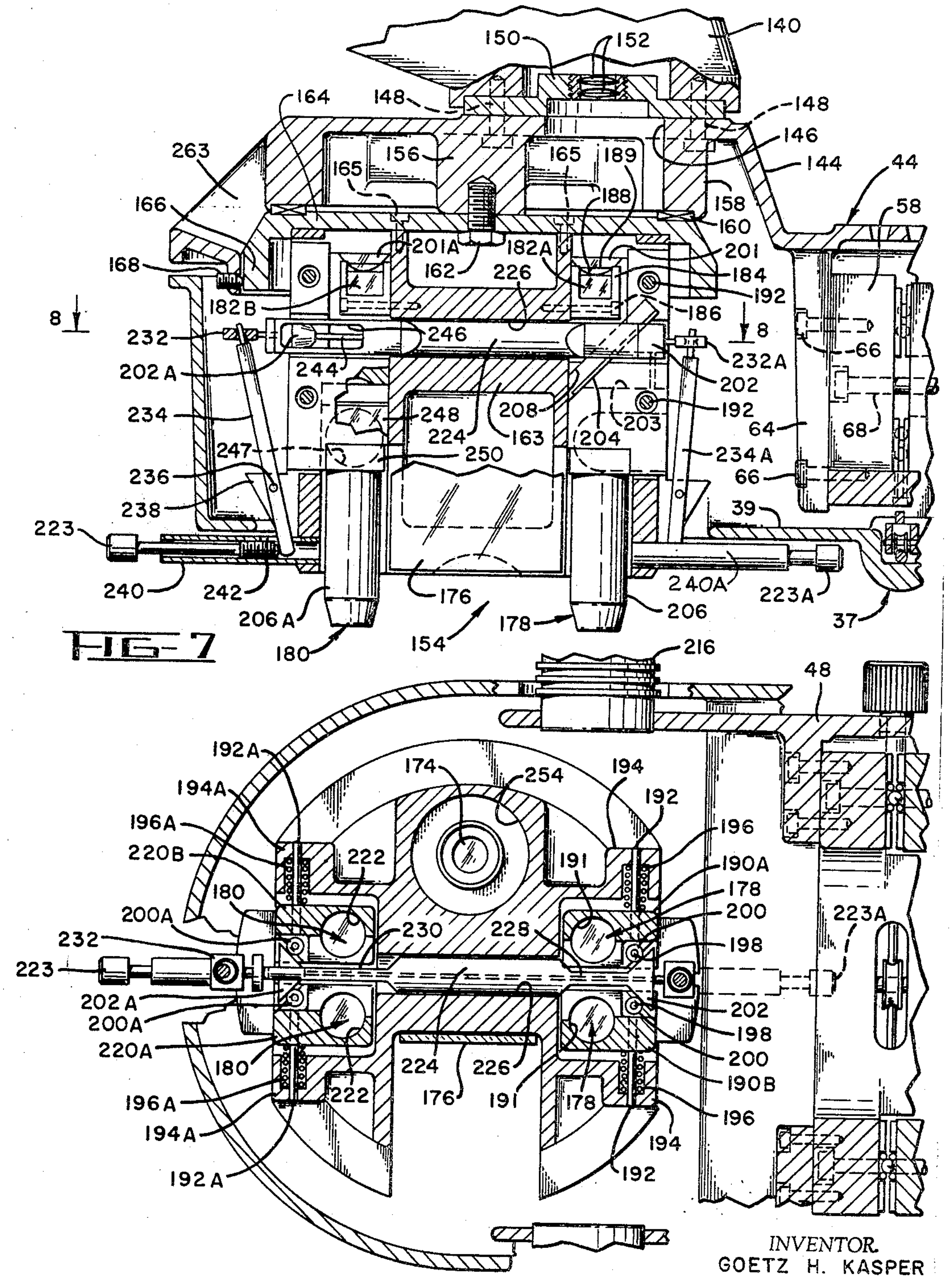
FIGURE 7 is a fragmentary vertical longitudinal cross sectional view through the objective lens system and turret which carries the same.
FIGURE 8 is a sectional view taken along line 8—8 of FIGURE 7.

As seen in FIGURES 1, 3 and 7, the top wall 46 of the cover 44 is formed with an upwardly protruding portion 144 at the forward end thereof upon which the eyepiece head 140 is mounted. As best seen in FIGURE 7, the top of the raised wall portion 144 is formed with an aperture 146 at which the eyepiece head 140 is attached by screws 148. A lens retaining ring 150 is mounted between the head and cover and carries transfer lenses 152 positioned in the optical path between the eyepiece and objective lens system.

The novel objective lens system of this invention is carried by a turret 154 which is mounted for rotation about a generally vertically extending axis. As best seen in FIGURE 7, the inside of the cover portion 144 is provided with a central downwardly extending boss 156 and a surrounding concentric flange 158. A thrust bearing 160 is provided between the lower face of the flange 158 and upper face of the turret 154, and a screw 162 extends through a central aperture in the turret and threadedly engages a tapped hole in the boss 156 for the rotatable support of the turret.

The turret 154 comprises a turret body 163 and cylindrical shaped top plate 164 attached thereto by screws 165. A resiliently biased detent device 168 carried by the cover 44 is adapted for engagement with any one of four indentations at quadrature spaced locations on the edge 166 of the plate 164 for releasably locking the turret at four angularly related positions. As will become apparent hereinbelow, the turret includes first and second split field objective lens systems, one single field objective lens system, and a mirror for directing the ultraviolet light from the lamp 50 onto the wafer to expose the same. In the illustrated arrangement, as seen in FIGURE 8, the single field objective lens system 174 is positioned diagonally opposite the mirror 176, and the split field objective lens systems 178 and 180 are positioned diagonally opposite each other in quadrature spaced relation from the single field lens system 174 and mirror 176.

In FIGURES 7 and 8 the turret is shown positioned with the split field objective lens system 178 in operative position with the lenses 152 of the eyepiece lens system. In this position of the turret, a beam splitting device 182A is located directly beneath the lenses 152. The beam splitting device is supported by a holder 184 which is secured by screws 186 to the turret body 163. The beam splitting device may simply comprise a right angle prism or block with mirror surfaces on the right angle faces. The apex 188 of the prism or block is located at the upper end thereof and in the operative condition is positioned directly beneath the lenses 152 in the eyepiece system. A small diameter focusing wire 189 is carried by the holder 184 directly above the prism a short spaced distance therefrom, upon which wire the optical system is focused. In this way, dust or impurities on the prism surfaces are not in focus.

The lens system 178 also includes a pair of complementary movable lens retaining blocks 190A and 190B, each of which is provided with a vertical bore 191 for the passage of light therethrough. The blocks are slidably mounted on pins 192 extending inwardly from a pair of arms 194 formed on the turret, and coil compression springs 196 carried on the pins extend between the arms and lens blocks to resiliently bias the blocks toward each other. The lens blocks 190A and 190B are provided with rollers 200 carried on vertically extending pins 198, which rollers are urged into engagement with a wedge-shaped adjusting member 202. Movement of the wedge to the left, as viewed in FIGURE 8, urges the blocks 190A and 190B apart whereas movement to the right permits the blocks to move together under action of the springs 196, whereby the separation of the optical axes of the split field objective system 178 is thereby adjustable. The mechanism for actuating the wedge 202 is shown in FIGURES 7 and 8, and described in detail below.

The lens blocks 190A and 190B each carry an inclined mirror 201 adjacent the upper end thereof opposite the prism 182A and above the passageways 191 for deflection of light beams travelling up through the passageways 191 onto the opposite sides of the prism 182A. With the split field lens system 178 in the operative position, illumination of the wafer is provided by the light beam from the lamp 50 passing through the filter 124 (see FIGURE 3). The filtered beam from the lamp 50 passes through openings 203 in the outwardly facing side of the blocks 190A and 190B and strikes semi-transparent mirrors 204 (only one of which is seen in FIGURE 7) carried by the blocks 190A and 190B. The mirrors 204 are mounted within inclined grooves 208 which intersect the longitudinal light passages 191 and the openings 203. A portion of the beam is deflected downwardly by the semi-transparent mirror through the passageways 191 and thence through lens tubes 206 which are attached to the blocks 190A and 190B at the lower end of the passageways, for illumination of the mask and wafer therebeneath.

Light from the illuminated spaced fields on the mask and wafer passes upwardly through the objective lenses contained in the lens tubes 206, directly through the semi-transparent mirrors 204, and strikes the mirrors 201. Light from the mirrors 201 is deflected onto the opposite sides of the prism 182A from whence it is reflected upwardly through the lenses 152. From there, the beams pass through the lenses of the eyepiece system 140 and thence to the binocular eyepieces 142 for viewing by the operator.

Figures 9, 10:
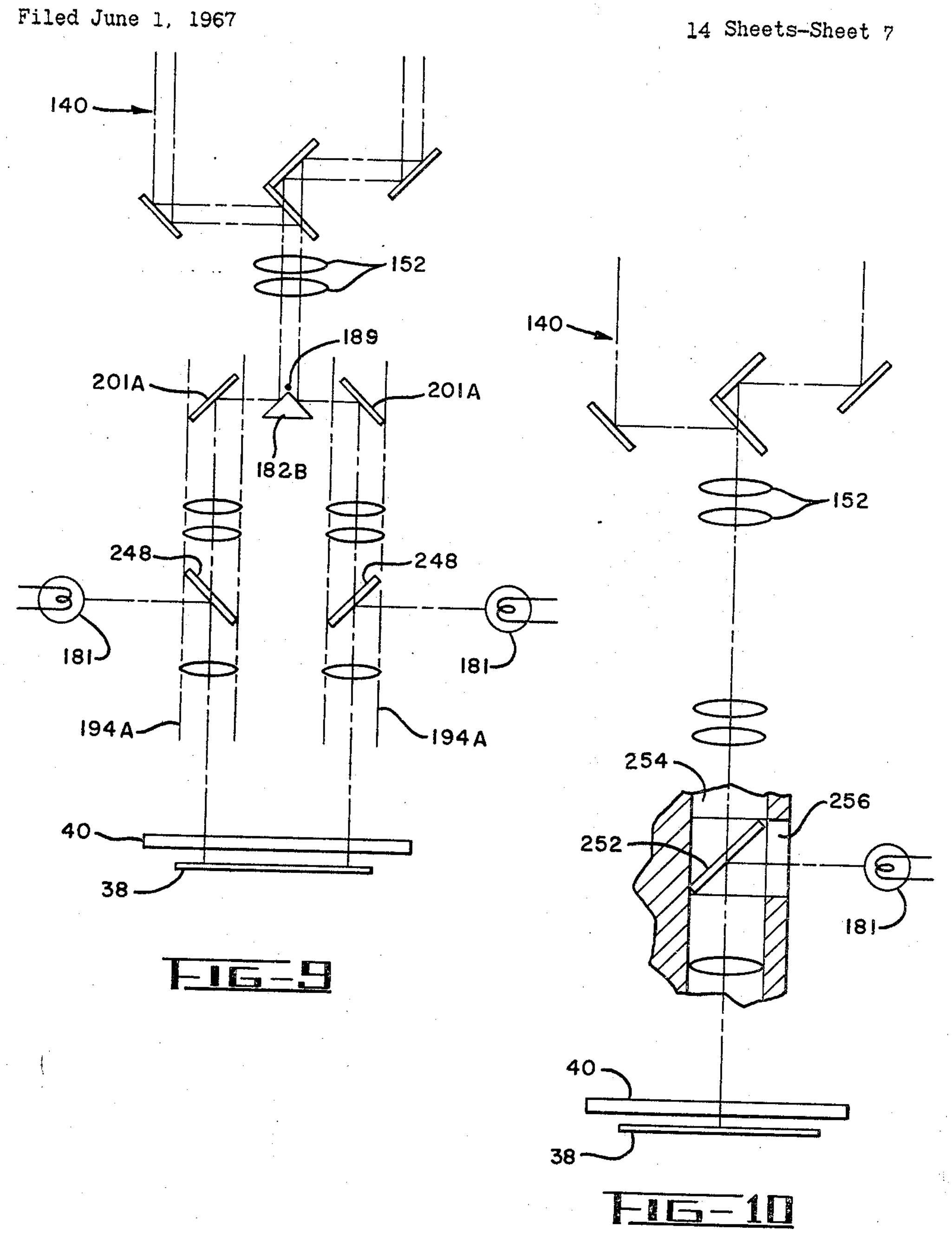
FIGURE 9 is a simplified diagrammatic view of the optical section of the instrument showing the light paths for the one split field system illuminated by white light lamps at opposite sides of the turret.
FIGURE 10 is a view which is similar to FIGURE 9 but showing the light paths for the single lens system.

Some operators prefer white light illumination of the mask and wafer rather than the filtered mercury vapor illumination. With the turret rotated 180 degrees from the position illustrated in FIGURES 7 and 8 the other split field objective lens system 80 is placed in operative position beneath the lenses 152 in the eyepiece system, and is illuminated by lamps 181 schematically shown in FIGURE 9, such as Zeiss Ikon tungsten illuminators carried within lamp housings 216 at opposite sides of the optical unit.

The split field objective lens system 180 is of similar construction to the lens system 178 and includes a beam splitting device 182B attached to the turret diagonally opposite the device 182A, which is positioned directly beneath the lenses 152 when the turret 154 is rotated 180 degrees from the position illustrated in FIGURES 7 and 8.

A pair of complementary lens blocks 220A and 220B, with vertical bores 222 therethrough, are slidably mounted on pins 192A extending inwardly from arms 194A on the turret and are resiliently biased toward each other by springs 196A. Rollers 200A on the blocks 220A and 220B engage a wedge shaped adjusting member 202A. As viewed in FIGURE 8, movement of the wedge 202A to the right urges the blocks 220A and 220B apart against the spring action, whereas movement to the right permits the blocks to move together under action of the springs 196A. It will be understood that adjustment of the wedge 202A for adjustment of the separation of the optical axes of the split field system 180 is performed when the turret is rotated 180 degrees from the position illustrated in FIGURES 7 and 8, in which rotated position the objective system 180 is in operative position.

Adjustment of the wedges 202 and 202A is under control of finger actuated adjusting screws 223 and 223A, respectively. The wedge 202 is formed at the end of a rod 224 slidably mounted in a radial bore 226 formed through the turret body 163. Reduced thickness portions 228 and 230 are formed adjacent opposite ends of the rod 224 where the rod passes between the blocks 190A and 190B and between the blocks 220A and 220B, respectively. An eye member 232 is secured to the forward end of the rod 224, into which the upper free end of a lever 234 extends. The lever 234 is pivotally mounted on a pin 236 extending between arms 238 extending from the turret body. The adjusting screw 223 is threadedly mounted in a tubular member 240 extending from the turret housing, and the lower end of the lever 234 extends through a slot 242 in the tube 240 and engages the end of the screw 223. By turning the screw 223 into the tube, the lever 234 is rocked in a counterclockwise direction, as viewed in FIGURE 7, to draw the rod 224 and attached wedge 202 to the left to spread the blocks 190A and 190B apart. When the screw 223 is turned for movement outwardly from the tube 240, the wedge 202 and attached rod 224 are urged to the right under action of the springs 196 on the blocks 190A and 190B whereupon the lever is pivoted in a clockwise direction to maintain the same in contact with the screw.

The wedge 202A for adjustment of the optical separation of the split field objective system 180 is attached to the end of a small diameter rod 244 extending through and slidably mounted in an axial bore in the rod 224. A transverse aperture 246 is formed through the reduced width portion 230 of the rod, from which the wedge 202A extends for engagement with the rollers 200A. The opposite end of the rod 244 is provided with an eye member 232A which connects to the adjusting screw 223A through the pivotal lever 234A. The inner rod 244 and attached wedge 202A are movable independently of the outer rod 224 and attached wedge 202 whereby adjustment of the optical separation of one of the split objective systems 178 or 180 has no effect upon the other system. Also, with the novel mechanism, adjustment of the separation is simply and conveniently effected from the front of the apparatus with the adjusting screw 223 or 223A extending in a forward direction. Further, the tubes 240 and 240A provide convenient handles for rotation of the turret.

As mentioned above, illumination of the mask and wafer with the objective lens system 180 in operative position is provided by lamps 181 in the holders 216 carried at diagonally opposite sides of the walls 48 of the housing. Openings 247 are formed in the outer walls of the blocks 220A and 220B in alignment with the lamp housings 216, which openings communicate with the vertical passageways 222. Semi-transparent mirrors 248 (see also FIGURE 9) are mounted in inclined grooves 250 in the blocks, which mirrors intersect the longitudinal light passageways 222 and transverse openings 247. A portion of the light beams from the lamps in the housing 216 is deflected downwardly by the semi-transparent mirrors through the passageways 222 and thence through lens tubes 206A attached to the blocks 220A and 220B for illumination of the mask and wafer therebeneath.

Light beams from the spaced optical fields on the mask and wafer pass upwardly through the objective lens tubes 206A, directly through the semi-transparent mirrors 248, and strike inclined mirrors 201A. Light beams from the mirrors 201A are deflected onto the opposite sides of the prism 182B from whence they are reflected upwardly through the lenses of the eyepiece system for viewing by the operator.

The split field lens systems 178 and 180 provide a relatively high magnification of say 180 to 600 diameters, for example, to enable precise alignment of the mask and wafer. In operation, as described in detail below, the turret is first rotated to position the single field objective lens system 174 directly beneath the lenses 152 in axial alignment therewith. In this position, illumination of the mask and wafer is provided by the tungsten filament lamp 181 in one of the housings 216. An inclined semi-transparent mirror 252 (seen in FIGURE 10) on the turret intersects a side bore 256 and the vertical bore 254 in which the single field objective lenses are mounted, whereby light from one of the tungsten lamps at the side of the optical head enters through the bore 256 and is deflected downwardly by the semi-transparent mirror 252 to illuminate the mask and wafer in the single field position of this turret. Light from the single field passes upwardly through the mirror 252, lenses 152, and thence to the eyepiece lens system for viewing by the operator.

For exposure of the wafer to ultraviolet light through the mask, the turret is turned to place the mirror 176 in a rearwardly facing direction in the path of the beam of light from the mercury vapor lamp 50. Filter 124 (FIGURES 3 and 4) is raised to an inoperative position and the light beam from the lamp 50 striking the mirror 176 is deflected downwardly onto the wafer through the mask to expose the wafer to the ultraviolet rays from the lamp 50. Energization of the lamp 50 during exposure may be under control of a timer switch 258 having a dial and knob 260 at the front of a panel 262 for selectively setting the exposure time (FIGURE 3). The switch automatically opens the lamp circuit at the end of the selected time. None of the light from the lamp 50 passes upwardly into the eyepiece lens system when the turret is in the exposure position.

A visual indication of the turret position is provided by indicia on the edge of the flange 166 of the plate 164 viewable through an opening or window 263 at the front of the cover portion 144 (see FIGURE 7). Indicia such as "Row and Column" for the single field objective, "Split Field Tungsten" for the tungsten illuminated split field objective, "Split Field Mercury" for the mercury vapor illuminated split field objective, and "Expose" for the exposure position of the turret may be provided.

With the optical head 26 in the lowered operative position illustrated in FIGURE 1, the microscope 52 is positioned above the mask 40 and wafer 38 for viewing the same through one of the split field lens systems or single field lens system carried by the turret 154, depending upon the turret position. The mask and wafer are supported by the base unit 28 which comprises a dish shaped base 264 and cover 265. The mask 40 is removably carried by a mask holder 266 accessible when the optical head 26 is raised to the position illustrated in FIGURE 3. Raising of the head 26 is under control of a hydraulic cylinder 268 having one end pivotally attached to a bracket 270 secured to the cover portion 265 of the base section 28 (see FIGURE 3). The piston rod 272 of the cylinder is pivotally connected to one end of a lever arm 274, and the other end of the lever arm is secured to a pivotal shaft 276. Also, secured to the shaft 276 is an actuating lever 278 having a roller 280 at the outer free end thereof which engages the bottom 39 of the optical unit 26. The lever arm 274 and actuating lever 278 function as a bell crank in the raising and lowering of the optical unit 26. It will be seen that the optical head 26 is raised by retracting the piston rod 272 into the cylinder and is lowered by extending the piston rod. A source of fluid pressure and suitable valve arrangement, not shown in FIGURE 3, for control of the hydraulic cylinder 268 is provided.

The mask holder 266 is pivotally attached to a top plate 282, which plate is mounted on a horizontally movable platform included in a novel mounting arrangement described in detail below. For present purposes it will be noted that the mask holder 266 is pivotally mounted on a pin 284 extending between a pair of spaced blocks 286 secured to the top plate 282 (see FIGURE 3). In the raised position of the head 26, the mask holder 266 may be pivoted about the axis of the pin 284 to the raised position designated 266–1 shown in broken lines in FIGURE 11. A spring biased plunger 285 reciprocally mounted in a support 287 serves as a stop member for the mask holder in the raised position. The end of the plunger, in the extended plunger position extends to the left of the vertical plane through the mask holder pivot axis whereby the mask holder remains in the raised position only so long as held by the operator. With this arrangement inadvertent lowering of the optical head 26 onto the raised mask holder is prevented.

An aperture 288 is formed through the mask holder, and locating lugs 290 extend from the bottom of the mask holder 266 for locating the mask 40 on the holder at the aperture. The mask, which is made of glass or other suitable transparent material with the desired pattern formed thereon, covers the aperture 288 and is held in position thereon by vacuum mounting means. The vacuum mounting means includes a groove 292 formed in the bottom of the holder 266 surrounding the aperture 288, which groove may be covered by the mask 40. The groove 292 connects through a passageway (not shown) in the holder 266 to a vacuum line 294, which line connects to a vacuum source through a normally open solenoid operated valve (not shown). The energization circuit for the solenoid of the valve includes a normally open microswitch 300 carried by the bracket 287, which switch is actuated by the mask holder in the raised position. With the switch 300 open the solenoid operated valve is also open for connection of the groove 292 to the source of vacuum for holding the mask 40 in position on the holder 266. When the switch is actuated by the raised mask holder the solenoid operated valve is energized to remove the vacuum connection to the groove 292 for release of the mask from the holder. The mask may be readily removed from the holder when so released, and another mask positioned thereon.

The lower surface of the mask holder also is provided with a pair of concentric resilient seal rings 304 positioned in grooves 306. In the operative, closed, position of the mask holder 266 the resilient rings 304 sealingly engage the upper surface of the top plate 282. A passageway 308 through the mask holder 266 communicates with the area between the seal rings 304 and connects through a hose or line 310 to the vacuum source. In the lowered, operative, position the mask holder 266 is urged into tight engagement with the plate 282. Vacuum between the seal rings 304 is released when the optical head 26 is raised to permit lifting of the mask holder 266.

Figure 11:
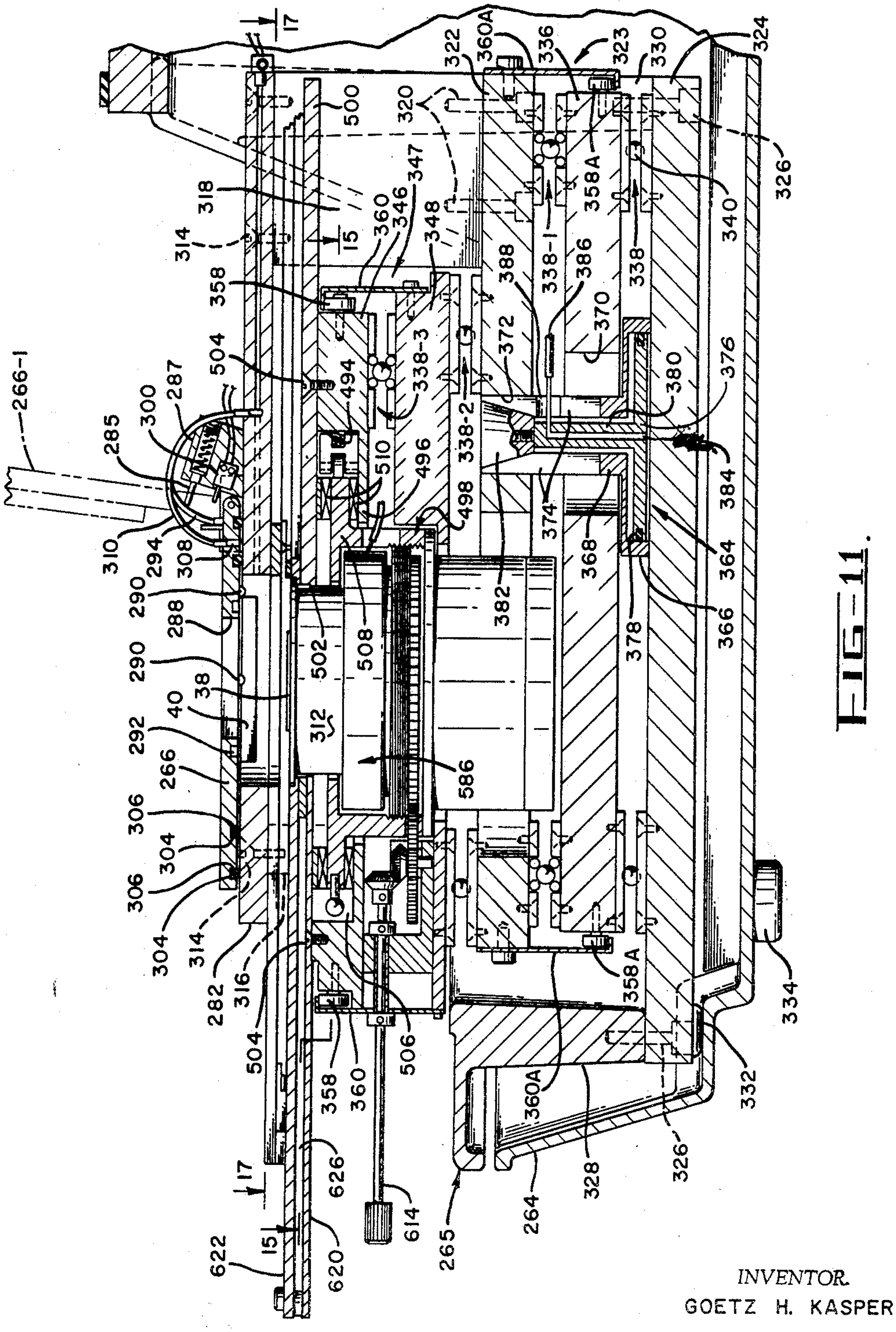
FIGURE 11 is a fragmentary vertical longitudinal cross sectional view taken through the forward end of the base unit and showing the mask holder and wafer chuck and movable mounting means therefor.

As seen in FIGURE 11, a vacuum chuck 312 for holding the workpiece or wafer 38 is positioned beneath the mask holder 266. The chuck is vertically movable (along what is termed the Z axis) from the illustrated lowered position where the wafer is fed onto and off from the chuck, to a fully extended position where the wafer is brought into face-to-face engagement with the mask. An intermediate vertical position of the chuck is also provided wherein the wafer is closely spaced from the mask, at which position alignment of the wafer with respect to or Z axis, and is movable in a horizontal plane (along X and Y axes) to permit proper alignment of the wafer with respect to the mask. In addition, the novel mounting means also provides for movement of the chuck 312 and mask 40 together, as a unit, for the proper positioning the mask is possible. In addition to being vertically movable, the vacuum chuck 312 is rotatable about the vertical, thereof in the microscope field.

Referring to FIGURE 11, the top plate 282 (which carries the mask holder 266) is shown attached by screws 314 to the upper end of posts 316 and 318, which posts, in turn, are secured by screws 320 to a first horizontally movable platform 322 of a first stage 323, whereby the top plate 282 with the attached mask holder 266 is movable in a horizontal plane upon movement of the platform 322. The mounting of the first platform 322 includes a stationary base plate 324 attached by screws 326 to flanges 328 and 330 formed on the cover 265. The cover 265 with the attached plate 324 is supported within the base member 264 on resilient shock absorbing legs 332. Similar shock absorbing legs 334 are provided on the base 264 for the support thereof.

As seen in FIGURE 11, the first platform 322 is mounted on the stationary base plate 324 through a first intermediate plate 336. The plate 336 is supported by bearings 338 on the base plate 324 which permit reciprocal longitudinal movement thereon. The bearings 338 comprise parallel extending rods secured to the plates 324 and 336, which rods serve as ways between which ball bearing members 340 are positioned. The bearings 338 are of the same construction as the bearings employed for reciprocally mounting the slides 58 and 60 on the bearing blocks 54 shown in FIGURES 5 and 6 and described above and require no further description. In the illustrated arrangement the intermediate plate 336 is movable longitudinally of the device in a direction designated the Y direction. The first platform 322 is reciprocally mounted on the intermediate plate 336 on bearings 338–1 of the same type as the bearings 338 but oriented at right angles thereto. The platform 322 is thereby movable transversely of the device in the X direction. With this bearing arrangement, it will be readily apparent that the platform 322 of the first stage 323 may be moved in any horizontal direction.

The platform 322 is mechanically connected to a control knob 342 shown in FIGURES 1, 2, 3 and 12 and is manually positioned thereof in a manner described below. For present purposes, it will be understood that with a transversely directed actuating force on the platform 322, the platform rolls across the intermediate plate 336 on the bearings 338–1, and with a longitudinally directed actuating force on the platform 322, the platform 322 and intermediate plate 336 as a unit roll along the base plate 324 on the bearings 338. Simultaneous movement of the platform 322 in both the X and Y directions is provided when the platform is subjected to a force with components in both the X and Y directions.

As seen in FIGURE 11, the vacuum chuck 312 for holding the wafer is mounted on a second movable platform 346 of a second stage 347, which platform, in turn, is mounted on the first movable platform 322 through a second intermediate plate 348. Mutually perpendicular bearing supports 338–2 and 338–3 (of the same type as bearings 338 and 338–1) support the plate 348 on the platform 322 and the platform 346 on the plate 348, respectively, for movement in mutually perpendicular directions along the X and Y axes of the device. The second platform 346 is connected to a second control knob or handle 350 (FIGURES 2 and 13) through a novel connecting linkage described below for manual movement of the platform 346 (and attached wafer chuck 312) in the X and Y directions relative to the first platform 322.

The platform 346 is supplied with rollers 358 along the forward and rear edges thereof, which rollers are engaged by the horizontal arms of inverted L-shaped brackets 360 attached by screws to the second intermediate plate 348. This arrangement prevents vertical separation of the platform 346 from the plate 348 while permitting transverse movement of the platform across said plate on the bearings 338–3. A similar arrangement of rollers 358A and brackets 360A are used to connect the platform 322 and plate 336 of the first stage. Also, the platform 322 of the first stage is connected to the plate 348 of the second stage by similar rollers and brackets, not shown, at the opposite side edges thereof.

As mentioned above, the control knob 342 is connected to the platform 322 for movement thereof for row and column scanning and the control knob 350 is connected to the platform 346 for movement thereof for alignment. Releasable locking means 364 shown in FIGURE 11 normally locks the platform 322 against movement, which locking means is released to permit scanning by use of the control knob 342. The locking means 364 as seen in FIGURE 11 comprises a cylinder 366 which is open at the bottom and rests upon the stationary base plate 324. A sleeve 368 extends upwardly from the cylinder through a large clearance hole 370 in the plate 336 and into a hole 372 in the platform 322. The sleeve is formed with longitudinally extending slots 374 extending downwardly from the upper free end thereof, which slots permit outward expansion of the sleeve into tight engagement with the hole 372.

A piston 376 is reciprocally mounted in the cylinder, and a seal ring 378 at the edge of the piston provides a fluid-tight engagement between the cylinder and piston. A rod 380 extends upwardly from the piston, and a sleeve expanding member 382 in the form of a wedge, enlarged head, tapered plug, or the like, is attached to the upper end of the rod. The cylinder 366 at the lower end of the piston 376 is adapted for connection to a vacuum source through a passageway 384 in the piston rod and a line 386 connected thereto and extending through an opening 388 in the side of the sleeve. With a vacuum connected to the line 386, the cylinder 366 is urged into tight engagement with the plate 324 to lock the same thereto. Simultaneously, the piston 376 is moved downwardly thereby pulling the enlarged head 382 downwardly to expand the sleeve 368 and tightly lock the sleeve to the plate 322. Under these conditions, the plate 322 is secured to the base 324 whereby no relative movement thereof is possible. When the line 386 is vented to atmosphere, the vacuum in the cylinder is released and the cylinder 366 is free to slide along the base 324. The slotted sleeve 368 is sufficiently resilient to return to a normal unflexed condition to urge the head 382 and attached piston upwardly. Under these conditions, a sliding fit is provided between the sleeve 368 and aperture 372.

Connection of the line 386 to a vacuum source is under control of a switch 390 at the handle, or knob, 342. (See FIGURES 1, 2, 3 and 12.) In the normal unactuated position of the switch, the line is connected to the vacuum source for locking the platform 322 to the base 324. Only when the switch 390 is actuated is the knob 342 movable for movement of the first stage platform 322.

Figure 12:
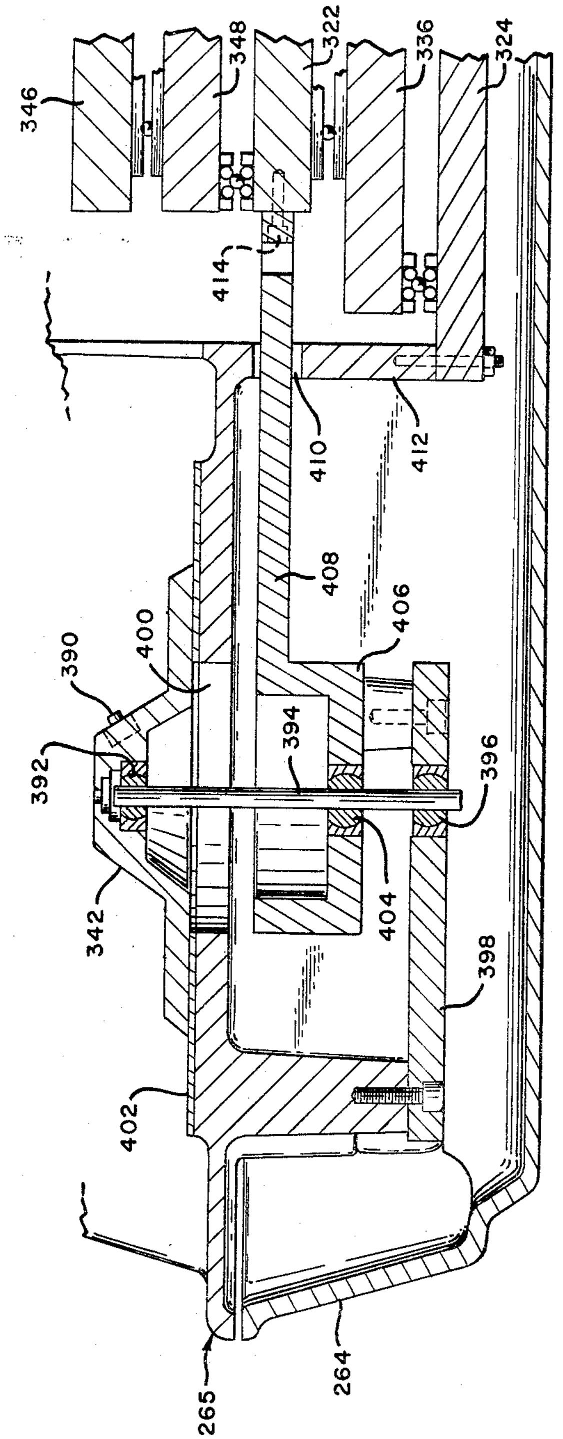
FIGURE 12 is an enlarged transverse cross sectional view taken substantially along line 12—12 of FIGURE 2 and showing the operating mechanisms for use in moving the mask and wafer together, as a unit.

The connection of the operating handle 342 to the first platform 322 for movement thereof by the handle is shown in FIGURE 12, to which figure reference is now made. The handle 342 is pivotally attached by a ball and socket connection 392 to the upper end of a lever 394. The lower end of the lever is pivotally attached by a second ball and socket connection 396 to a plate 398 attached to the cover 265. A large clearance hole 400 is provided in the cover 265 through which the lever 394 extends to permit relatively large pivotal movement of the lever in any direction from the vertical. A still larger diameter disc 402 at the bottom of the handle 342 covers the hole 400 in any angular position of the lever. It will be apparent that the lever 394 is pivoted by actuation of the handle 342 in any horizontal direction.

The lever 394 is connected through a third ball and socket connection 404 to a bracket 406, which bracket has an arm 408 extending through an aperture 410 in a flange 412 formed on the inside of the cover 265. The arm is attached by screws 414 to the first platform 322 for actuation of said platform in any horizontal direction. With transverse movement of the handle 342, the platform 322 is moved to the right or left, as viewed in FIGURE 12, across the intermediate plate 336. With longitudinal movement of the handle 342 (in a direction into or out of the plane of the drawing) the platform 322 and intermediate plate 336 are moved together along the base plate 324. As described above, both the second platform 346 which carries the wafer chuck 312 and the top plate 282 which carries the mask holder 266, are moved together as a unit upon movement of the first platform 322. Also, as described above, the switch 390 on the handle 342 must be depressed to unlock the platform 322 before movement of the handle 342 is possible.

Figure 13:
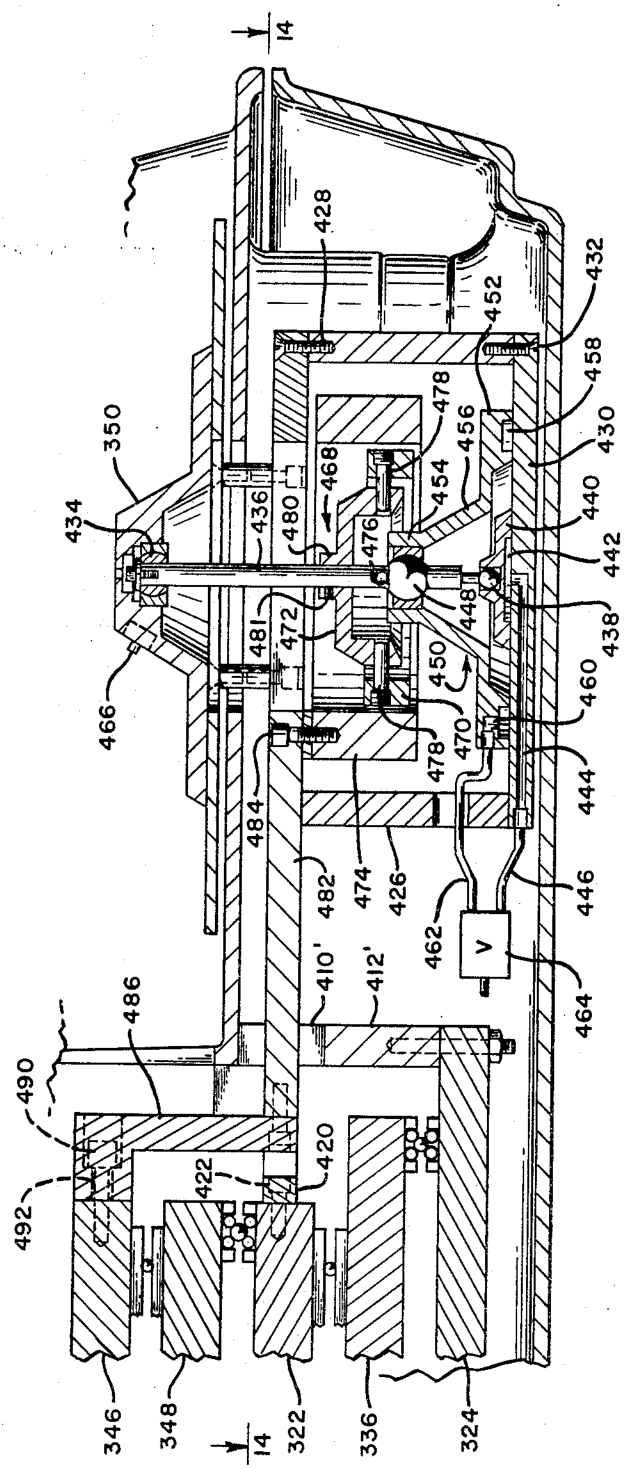
FIGURE 13 is an enlarged transverse cross sectional view taken substantially along line 13—13 of FIGURE 2 and showing the operating mechanism for use in alignment of the mask and wafer.
Figure 14:
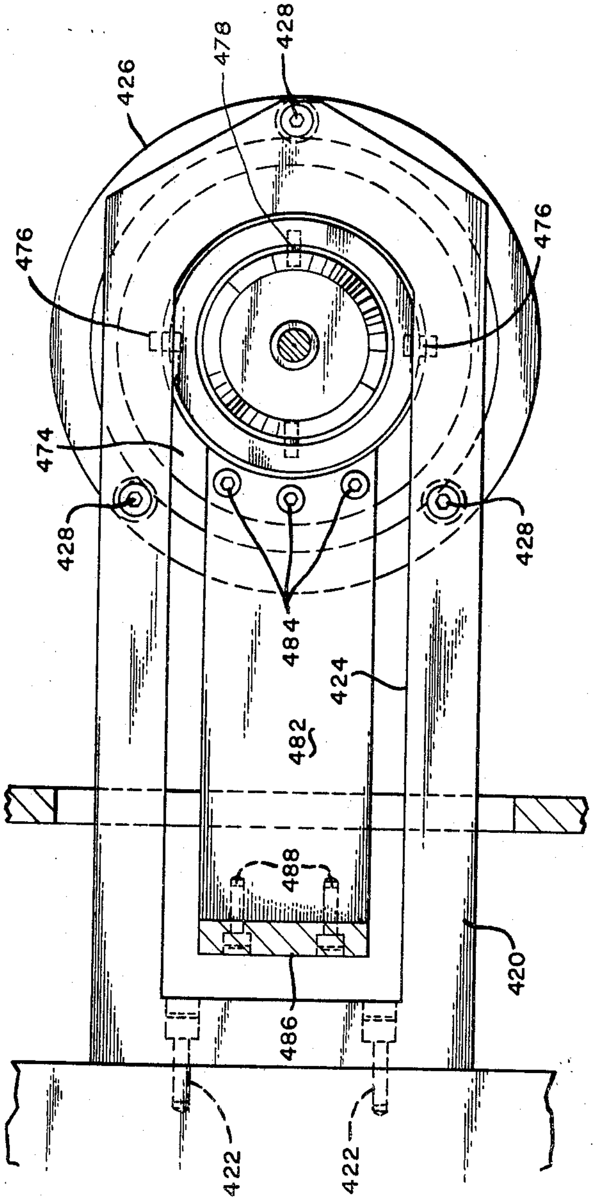
FIGURE 14 is a sectional view taken along line 14—14 of FIGURE 13.

An actuating mechanism for movement of the second platform 346 relative to the first platform 322 for adjustment of the wafer chuck 312 relative to the mask holder 266 is illustrated in FIGURES 13 and 14 of the drawings to which figures reference is now made. This actuating mechanism, which includes a novel arrangement for coarse and fine adjustment, is under control of the handle 350. The actuating mechanism is carried by an arm 420 attached to one edge of the first platform 322 by screws 422. The arm 420, which is in the form of a flat plate with a central aperture 424 therein, extends through an aperture 410′ in a flange 412′ formed on the inside of the cover 265. A generally cylindrical shaped housing 426 is attached by screws 428 to the bottom surface of the arm 420 adjacent the outer free end thereof for the support of a base plate, or platform 430 which is secured by screws 432 to the bottom of the housing. Because the arm 420 is attached to the platform 322, it will be seen that it is moved upon movement of the platform 322 by the handle 342 (shown in FIGURES 1, 2, 3 and 12) and is locked against movement when the platform 322 is locked by the locking device 364 shown in FIGURE 11 and described above.

The handle 350, as seen in FIGURE 13, is pivotally attached by a ball and socket connection 434 to the upper end of a lever 436. The lower end of the lever 436 is pivotally attached by a second ball and socket connection 438 to an anchor means, such as vacuum plate 440 which is releasably secured to the base plate 430. The socket of the ball and socket connection 438 is cylindrical-shaped to permit axial movement of the ball therein when the lever is pivoted. A recess 442 is formed in the bottom of the plate 440 to provide a vacuum chamber with the face of the base plate 430, which chamber communicates with a passageway 444 in the plate extending to the edge thereof. The passageway 444 is adapted to be connected to a vacuum source through a line 446 and a control valve 464. When a vacuum is applied to the line 446, the plate 440 is secured to the base plate 430, whereupon the ball and socket 438 comprises the fulcrum of the lever. When the vacuum is released, the vacuum plate 440 is free to slide along the base plate 430.

In accordance with this invention another pivotal connection, such as the ball and socket arrangement 448, is provided intermediate the upper and lower ends of the lever 436, for pivotally connecting the lever to a second anchor means or vacuum plate 450. The vacuum plate 450 comprises a lower ring section 452 in engagement with the plate 430, an upper ring section 454 which contains the socket of the ball and socket 448, and an interconnecting tapered wall 456. This vacuum plate 450 is also releasably secured to the base plate 430 by vacuum means. An annular recess or groove 458 is formed in the bottom of the ring section 452 which communicates with a passageway 460 in the ring 452. The passageway 460 is adapted to be connected to a vacuum source through a line 462 and the control valve 464. When the valve 464 is actuated for connection of the line 462 to the vacuum source, the other line 446 is vented to the atmosphere. Under these conditions, the vacuum plate 450 is secured to the plate 430 whereby the ball and socket 448 comprises the fulcrum of the lever, and the vacuum plate 440 is free to slide along the base 430 upon pivotal movement of the lever.

When the valve 464 is actuated for connection of the line 446 to the vacuum source, the other line 462 is vented to atmosphere, whereby the vacuum plate 440 is secured to the plate 430 and the vacuum plate 450 is free to slide along the base 430. A switch 466 for control of the solenoid actuated valve 464 is mounted on the handle 350 for ready access without releasing the handle. In the normally open switch position the valve solenoid is deenergized for connection of the chamber 442 to the vacuum source and connection of the groove 458 to the atmosphere.

A gimbal 468 is included in the connection of the pivotal lever arm 436 to the second platform 346. The gimbal 468 comprises two gimbal rings 470 and 472. The one ring 470 is pivotally connected to a tubular bracket 474 by diagonally opposite pivot pins 476 (only one of which is seen in broken line view in FIGURE 13), and the second ring 472 is pivotally connected to the first ring by pivot pins 478 extending at right angles to the first pins 476. The ring 472 is formed with a central hub 480 through which the lever 436 extends, and a set screw 481 in the hub fixes the ring to the lever. It will be seen that the axial distance along the lever 436 between the intersection of the axes of the pivot pins 476 and 478 with the lever axis and the center of the ball and socket 438 is greater than the corresponding axial distance between the intersection of the axes of the pivot pins 476 and 478 with the lever axis and the center of the ball and socket 448. Consequently, coarse control of the bracket 474 (and platform 346 connected thereto in the manner described below) is provided when the ball and socket connection 438 serves as the fulcrum of the lever arm 436, and fine control is provided when the ball and socket connection 448 serves as the fulcrum.

The bracket 474 is connected to the platform 346 through an arm 482 which is attached to the bracket by screws 484. The arm 482 extends through the aperture 410′ in the flange 412′, and an upwardly extending link 486 having a lower end attached to the inner free end of the arm 482 by screws 488 and an upper end attached to the upper platform 346 by screws 490 connects the arm to the platform. The arm 482 is located within the aperture 424 in the arm 420 but is of a smaller size than the aperture to permit movement of the arm 482 therewithin in a horizontal plane.

Pivotal movement of the lever 436 by actuation of the handle 350 will result in relative movement of the platforms 322 and 346. In practice the platform 322 is locked in position by the locking device 364 (FIGURE 11) when the platform 346 is moved by pivotal movement of the lever 436. As is well understood, in the first and subsequent masking processes in the manufacturing process, the wafers are provided with key patterns or markings, and the masks used in the second and subsequent masking processes have cooperating key patterns or markings which must be brought into alignment with the markings on the wafer. The handle 342 is used to move the platform 322 which carries the mask holder 266 into position for viewing the desired key pattern or patterns on the mask. With the mask pattern or patterns in view, the handle 350 is used to move the platform 346 which carries the wafer chuck 312 into position for alignment of the key pattern on the wafer with the corresponding pattern on the mask. Coarse adjustment of the wafer to bring the wafer pattern into approximate alignment with the mask pattern is provided by movement of the handle 350 with the switch 466 in the released position for pivotal movement of the lever 436 about the ball and socket 438 at the end of the lever. Fine adjustment is provided by closing the switch 466 whereupon the fulcrum of the lever is shifted to the ball and socket 448 for increased mechanical advantage.

The distance along the lever 436 between the center of the ball and socket connection 448 and the intersection of axes of the pivot pins 476 and 478 with the axis of the lever arm may be made very short whereby large pivotal movement of the lever 436 produces very small horizontal movement of the platform 346. Adjustment of this distance is provided by loosening the set screw 481, which secures the hub 480 of the gimbal ring 472 to the lever 436 and by loosening the screws 490 which secure the link 486 to the platform 346. Vertically elongated holes 492 (only one of which is shown) are provided in the link 486 to permit vertical adjustment of the gimbal 468 and attached arms when the screws 481 and 492 are loosened.

In addition to being adjustable along the X and Y directions in a horizontal plane, the wafer chuck also must be adjustable in a rotary direction about the vertical or Z axis of the chuck. As seen in FIGURE 11 the upper platform 346 is provided with an aperture 494 through which the chuck 312 extends. A radial flange 496 is formed at the lower end of the aperture 494 for the rotatable support of a generally annular-shaped chuck holder 498. A plate 500 with an aperture 502 in axial alignment with the aperture 494 in the platform 346 is secured to the top of the platform by screws 504 whereby an annular channel 506 is formed between the flange 496 on the platform 346 and the plate 500. The chuck holder 498 is formed with an outwardly directed radial flange 508 which extends into the channel 506, and thrust bearings 510 at the upper and lower faces of the flange 508 rotatably support the holder 498 on the platform 346. Three roller bearings 512–1, 512–2 and 512–3 (see FIGURE 15) are provided at the periphery of the flange 508 on the holder 498 to maintain the chuck holder in axial alignment with the aperture 494. Two of the rollers 512–1 and 512–2 are mounted on rods fixedly secured to the platform whereas the third roller 512–3 is carried by a block 514 radially slidable in a groove in the platform. A spring 516 resiliently biases the block 514 toward the chuck holder for engagement of the roller 512–3 with the chuck holder which, in turn, is urged into engagement with the rollers 512–1 and 512–2.

Figure 15:
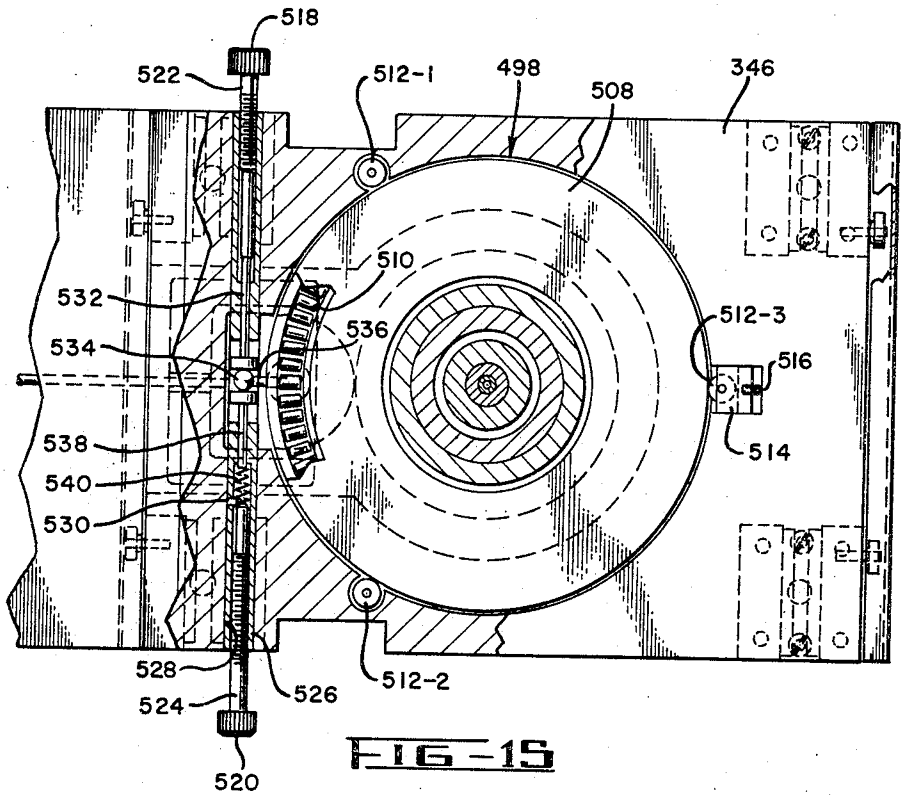
FIGURE 15 is a cross sectional view taken substantially on line 15—15 of FIGURE 11 showing the rotary adjusting mechanism for the wafer chuck holder.

Fine and coarse rotatable adjustment of the chuck holder 498 is provided by a rotatable adjusting knob 518 and locking knob 520, respectively, at opposite sides of the platform 346 as shown in FIGURE 15. Referring to FIGURE 15, the knobs 518 and 520 are fixed to the outer ends of rotatable rods 522 and 524, respectively, threadedly engaged in tapped holes at opposite ends of a slide 526. The slide 526, in turn, is mounted in a groove 528 extending across the platform 346, and is releasably locked in the groove 528 by a locking pin 530 extending through an aperture in the side of the slide. The inner end of the rod 524 is beveled for engagement with the beveled end of the locking pin. When the knob 520 is rotated to turn the rod 524 into the slide, the pin 530 is urged outwardly against the wall of the groove 528 to lock the slide in the groove.

The other axially adjustably positioned rod 522 engages one end of a slidable push rod 532, the other headed end of which push rod engages a ball 534 carried at the end of a pin 536 extending from the flange 508 on the chuck holder 498. A second headed push rod 538 directly opposite the rod 532 is resiliently urged into engagement with the ball 534 by a compression spring 540 at the outer free end of the rod 538. It will be seen that when the rod 522 is rotated for movement into the slide, the chuck holder 498 is rotated in a counterclockwise direction as viewed in FIGURE 15, by the direct action of the push rod 532 on the ball 534, and that when the rod 522 is rotated in the opposite direction the chuck holder is rotated in a clockwise direction by action of the spring biased rod 538 on the ball. The threaded connection between the rod 522 and slide 526 provides for fine rotatable adjustment of the chuck. Coarse rotatable adjustment of the chuck is provided by turning the knob 520 to release the locking pin 530. When the pin is released, the slide 526, with the push rods 522 and 524 carried thereby, is then axially movable for coarse rotatable adjustment of the chuck.

Figure 16:
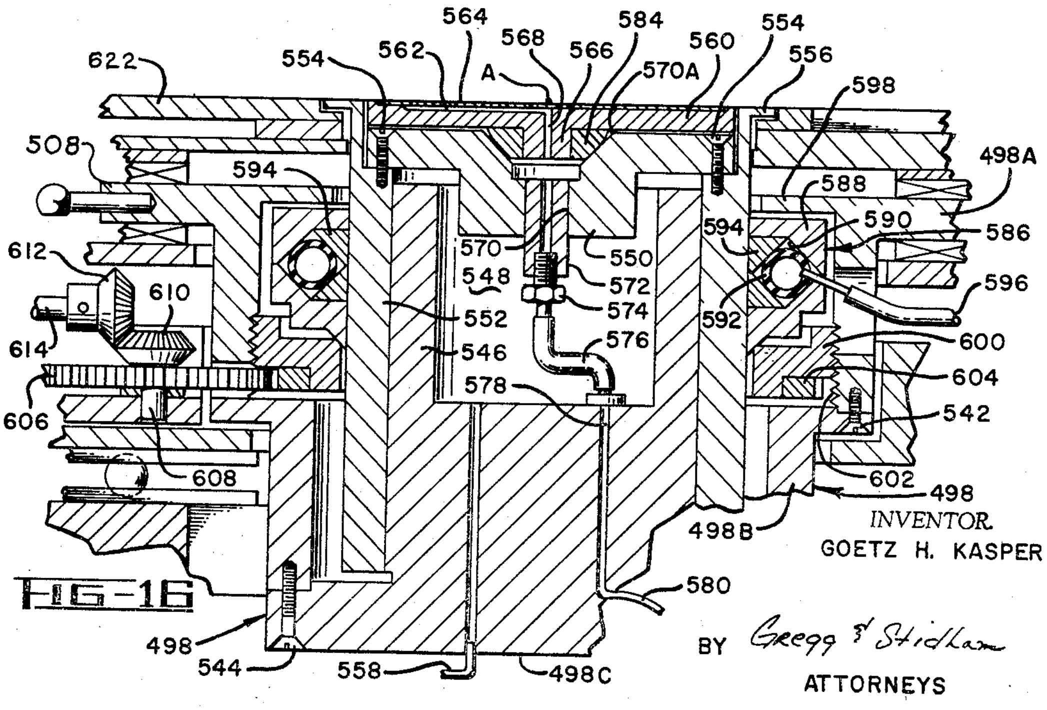
FIGURE 16 is an enlarged vertical longitudinal sectional view through the novel wafer vacuum chuck and chuck actuating mechanism.

Referring now to FIGURE 16, the chuck holder 498 is shown comprising an upper part 498A (which is formed with the radial flange 508, mentioned above), an intermediate annular section 498B with a radial flange at the upper end and secured to the uper part 498A by screws 542, and a lower part 498C attached to the intermediate part 498B by screws 544. A generally cylindrical-shaped wall 546 is formed on the bottom part 498C and extends upwardly through the intermediate and top parts 498A and 498B at a spaced distance therefrom. A chamber 548 is formed inside the cylindrical wall 546, the upper end of which chamber is closed by an end member 550 having a downwardly extending sleeve 552 attached thereto by screws 554. The sleeve 552 telescopically surrounds the wall 546 and is axially slidable therealong. A flange 556 on the sleeve 552 limits downward travel of the sleeve. The sleeve is raised by application of fluid pressure, such as compressed air, to the chamber 548 through a line 558 at the bottom part 498C. Lowering of the sleeve is under action of gravity when the chamber is vented to the atmosphere. Also, to facilitate lowering, the line 558 may be connected to a source of vacuum.

The wafer chuck 312 includes a chuck plate 560 carried by the end member 550. The chuck plate is formed with a plurality of interconnected radial grooves 562 in the face thereof, and a perforated top plate 564 covers the face thereof. A central stem 566 extends downwardly from the bottom of the plate 560 and is provided with an axial bore 568 which communicates with the grooves 562 in the face of the plate. The end member 550 is formed with an axial bore 570, the upper end of which bore flares outwardly as at 570A. A sleeve 572 is provided at the lower cylindrical end of the bore 570, which sleeve is adapted for connection to a vacuum source through a fitting 574, tubing 576, passageway 578 in the bottom member 498C, and flexible tubing 580. The tube 580 is adapted for connection to a vaccum source through a valve, not shown. With a vacuum applied to the chuck plate, the wafer 38 is held firmly thereon and when the valve is actuated to vent the line 580 to the atmosphere, the wafer 38 is free to be moved across the chuck.

The wafer 38 is loaded onto the perforated plate 564 of the vacuum chuck and removed therefrom by moving the same along a top plate 622 onto and off the chuck when the chuck is in the lowered position. Novel loading and unloading mechanisms for the wafer are described in detail below. With the wafer on the chuck, and a vacuum applied thereto through the line 580 to hold the same in position, the chamber 548 is pressurized to raise the wafer, 38 into contact with the bottom of the mask 40 (seen in FIGURE 1). To assure a face-to-face engagement of the wafer 38 with the mask 40, the chuck plate is mounted for pivotal movement about a vertical axis in any horizontal direction. To this end, a bearing member 584 in the form of a section of a sphere is secured to the stem 566 of the plate 560 and is received in the conical-shaped inner side wall portion 570A of the bore 570. The spherical section of the bearing member 584 has a center of radius at substantially the top supporting surface of the chuck plate at the center thereof, at a point designated A in FIGURE 16. Clearance space is provided between the chuck plate 560 and end member 550 to permit tilting of the chuck plate in any horizontal direction as required. Consequently, when the chuck is raised a face-to-face engagement of the wafer 38 with the mask 40 is assured. When the chuck plate is lowered, the friction engagement between the bearing 584 and bearing receiving well 570A is sufficient to maintain the parallel relationship between the adjacent faces of the mask and wafer. By forming the bearing member 584 with a spherical section having a center of radius at approximately the upper surface of the chuck plate, transverse movement of the chuck plate during pivotal movement thereof is prevented, and scraping of the wafer across the mask when the unaligned mask and wafer are brought into face-to-face engagement is substantially eliminated.

After the chuck has been raised to bring the wafer into engagement with the mask, in the manner described above, the chuck is lowered slightly to separate the wafer and mask to permit alignment thereof. With the novel chuck of this invention, a constant spacing is provided between the mask and wafer for all wafers regardless of differences in wafer thickness. This spacing is readily adjustable, but once set it is seldom adjusted again. As seen in FIGURE 16, a locking device 586 surrounds the vertically movable sleeve 552, which device is releasably secured to the sleeve. The locking device, comprises a ring 588 formed with an annular grove 590 in the inside wall thereof. A resilient, inflatable, annular tube 592 is seated on the V-shaped bottom of the groove 590 against which tube jaw members 594 abut. The jaw members 594 comprise sections of a ring formed with a generally triangular shaped groove at the outer diameter thereof in which the inflatable tube 592 seats. Two or more ring sections 594 are employed. The inflatable tube 592 is connected through a tube, flexible tubing 596, and valve (not shown) to a source of fluid pressure such as compressed air. When the valve is opened to the pressure source the tube 592 is inflated and the ring sections 594 are urged radially inwardly into clamping engagement with the sleeve 552 to lock the ring 588 to the sleeve 552. When the pressure is released and the tube 592 deflated, the ring sections 594 and sleeve 552 are relatively axially slidable. In the deflated condition, a sufficient frictional engagement between the ring sections and sleeve is provided by the resilient tube 592 to prevent the ring 588 from sliding downwardly under the force of gravity.

Vertical movement of the locking ring 588 in the upward direction is limited by a first stop comprising an inwardly directed flange 598 formed on the chuck holder section 498A and movement in the downward direction is limited by a second stop comprising an adjustable stop ring 600. External threads are formed on the stop ring which engage a threaded portion 602 at the lower end of the inside wall of the upper section 498A of the chuck holder 498. A ring gear 604 is attached to the adjustable stop 600 by means not shown, and a spur gear 606 affixed to a shaft 608 engages the ring gear 604 for drive rotation thereof. The shaft 608 is adapted for connection through bevel gears 610 and 612 to a shaft 614 extending from the front of the instrument as shown in FIGURE 11. It will be seen that the amount of vertical travel of the locking ring 586 between the flange 598 and adjustable stop 600 is adjustable by rotation of said stop member 600 by rotation of the shaft 614.

In the operation of the device, after the wafer is loaded on the chuck, the chuck is raised to bring the wafer into engagement with the mask, in the manner described above. The tube 592 in the locking ring 586 is deflated during this operation whereby the locking ring is raised into abutting relation with the flange 598 at which point upward movement of the locking ring is stopped while the chuck continues moving upwardly to bring the wafer into engagement with the mask. With the chuck and locking ring in the raised position, the locking ring 586 is then clamped to the sleeve 552 by inflation of the tube 592. The chuck is then lowered by connection of a vacuum to the chamber 548 whereupon the sleeve 552 and attached chuck plate moves downwardly. Downward movement of the sleeve 552 is now limited by engagement of the locking ring 586 with the stop ring 600. It will be seen that this downward movement of the sleeve 552 (when the locking ring 586 is clamped thereto) is the same for all thickness of wafers since the locking ring is clamped to the sleeve only after the wafer and mask are brought into engagement. The stop ring 600 is generally left at a given setting and not adjusted for different wafers. With this arrangement the wafer is always spaced a predetermined distance below the mask during the aligning process whereby the microscope remains in focus with different thickness wafers to eliminate the need to refocus after each wafer alignment. To lower the chuck to the wafer loading and unloading position the locking ring 586 is released from the sleeve 552 to permit the sleeve to travel down to the lowermost position.

Novel wafer storage and wafer loading and unloading mechanisms may be provided for feeding the wafer onto the chuck and for the removal of the exposed wafer therefrom. As seen in FIGURE 11, the forward end of the top plate 500 is formed with a reduced thickness section 620, and a second, upper, plate 622 is attached by screws 624 (see FIGURE 17) to the top of plate 500 a parallel spaced distance from the reduced thickness section 620 to form a tray-receiving slot 626 therebetween.

A circular tray 628, shown in FIGURES 17 to 20 is rotatably mounted in the tray-receiving slot. The tray 628 comprises a circular plate formed with wafer-receiving recesses designated 630A through 630E at spaced distances about the periphery thereof, five such recesses being shown in the tray 628. The tray is provided with a downwardly extending centrally located pin 632, and the lower plate section 620 is formed with an outwardly flared pin receiving groove 634 within which groove the pin is guided during removal and replacement of the tray in the slot 626. The tray is rotatable about an axis at the inner end of the groove when the tray is fully inserted.

The tray is formed with a plurality of elongated radially extending slots 636 at each of the wafer receiving recesses 630A–E, which slots extend to the edge of the tray. The slots in the tray are alignable with a slot in the plate 620 at the position of the recess 630A shown in FIGURE 17. The upper plate 622 is formed with a finger-like cutout portion 638 through which two adjacent recesses in the tray are accessible. The slots 636 facilitate removal of the wafers from the recesses in the tray. For example, a pair of tweezers may be used to lift the wafer from the recess 630A shown in FIGURE 17, by extending one arm of the tweezers through the slot. Alternatively, a vacuum operated wafer handling tool may be used which includes a vacuum nozzle adapted to be extended through the slots 636 from the bottom thereof for picking a wafer out of the recess and placing the same onto the plate 622 in the position indicated by the wafer designated 38A in FIGURE 17.

Figure 17:
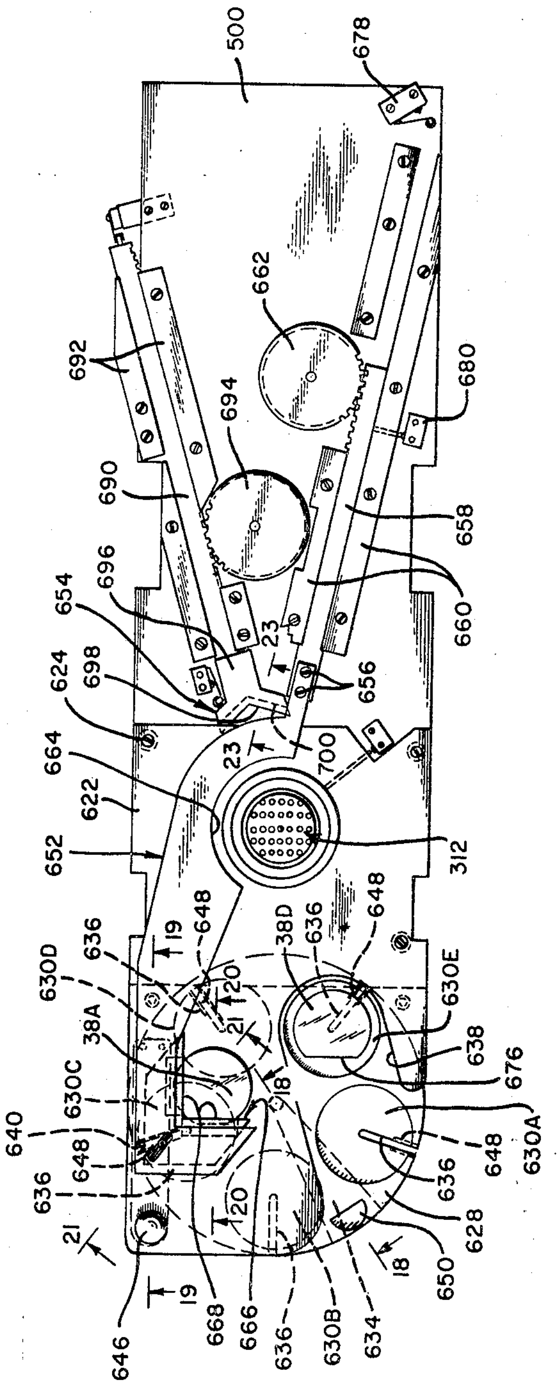
FIGURE 17 is a plan view of the wafer loading and unloading mechanism taken along line 17—17 of FIGURE 11.
Figure 19:
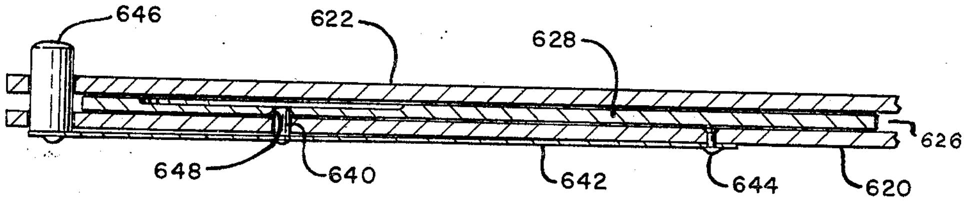
FIGURE 19 is an enlarged fragmentary cross sectional view taken along line 19—19 of FIGURE 17 and showing the wafer tray detent and locking device.

A detent mechanism is provided for releasably locking the tray 628 with any one of the wafer-receiving recesses at the unloading position shown occupied by the recess 630A in FIGURE 17. The detent mechanism comprises a detent member, or pin, 640 carried by a resilient arm 642 having one end attached by rivets 644 to the bottom of the plate 620. The other end of the arm is provided with a push rod, or button 646 which extends upwardly through apertures in the plates 620 and 622 for ready access by the operator. The detent member 640 is adapted to engage the slots 636 in the tray to lock the tray at the five rotary positions provided by the five slots 636. Four of the slots 636 at recesses 630A and 630C through 630E are formed with chamfered edges 648 whereas the slot 636 at the recess 630B is not chamfered. The pin 640 is adapted for releasable engagement with the chamfered slots, and locking engagement with the non-chamfered slot.

In FIGURE 17, the tray is shown in a start position wherein recesses 630A and 630E are accessible through the slot 638. A thumb recess 650 between the wafer-receiving recesses 630A and 630B aids the operator to properly orient the tray during insertion in the slot. In the start position, the detent member 640 engages the chamfered edge of 648 at recess 630C. During use, the tray is manually rotated, step-by-step, in a counter-clockwise direction until the detent member 640 engages the unchamfered slot at the recess 630B to lock the tray against further rotation. The tray is released by actuation of the push button 646 whereupon the tray is rotatable to the start position for removal from the apparatus.

As mentioned above, in use, a pair of tweezers, vacuum nozzle, or like hand operated device is used by the operator to remove a wafer from the tray and place the same onto the plate 622 in the position indicated by the wafer designated 38A in FIGURE 17 in preparation for movement onto the chuck 312. A reciprocally mounted loading slide 652 moves the wafer 38A along the plate 622 and onto the chuck 312, where the wafer and mask are brought into proper alignment and then exposed to the ultraviolet light source. After exposure, the wafer is removed from the chuck 312 by a reciprocally mounted unloading slide 654 which pushes the wafer off the chuck, along the plate 622, and onto the tray 628 through the cutout finger 638.

The loading slide 652, as seen in FIGURE 17 is attached by screws 656 to the top of a rack 658 reciprocally mounted between a pair of ways 660 attached to the plate 500, one of which ways is segmented to permit engagement of the rack by a pinion gear 662. The gear 662 is attached to the shaft of a reversible motor, not shown, for drive actuation of the slide 652. In FIGURE 17 the slide 652 is shown in the normal retracted position. An arcuate cut out portion 664 is formed in the slide to permit viewing of the wafer on the chuck from above by the microscope in the retracted position of the slide.

Figure 20:
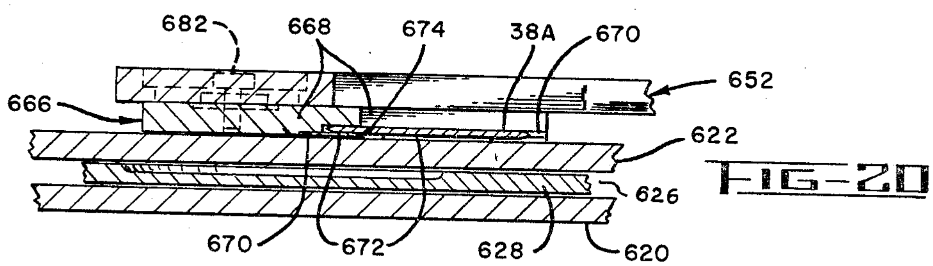
FIGURE 20 is an enlarged fragmentary cross sectional view taken along line 20—20 of FIGURE 17 and showing the wafer loading head on the loading slide.
Figure 18:
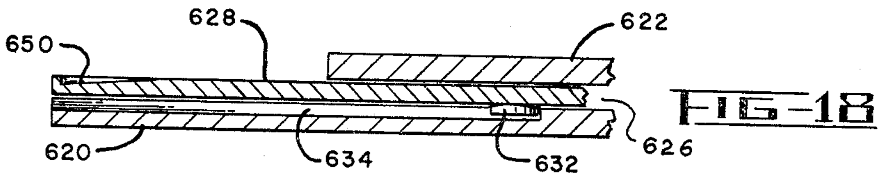
FIGURE 18 is an enlarged fragmentary sectional view taken on line 18—18 of FIGURE 17 and showing the wafer tray mounting.
Figure 22:
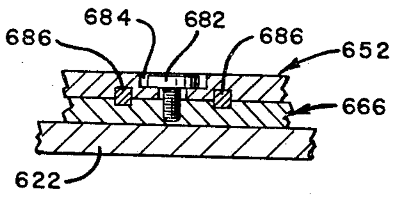
FIGURE 22 is a cross sectional view taken along line 22—22 of FIGURE 21.

The outer free end of the slide 652 is provided with a generally V-shaped wafer carrying head 666 comprising a pair of arms 668 extending at right angles to each other, and which open generally in the direction of the chuck. As seen in FIGURES 17 and 20 the lower inner edge of each of the arms 668 is formed with a stepped recess 670. Flat blades 672 are attached by means, not shown, such as welding, cementing, or the like, to the lower step of said recesses. The bottom surfaces of the blades 672 rest upon the surface of the plate 622, and the forward edges of the blades are beveled upwardly as at 674. Wafer receiving slots are formed by the upper step of the recesses and the blades, into which slots quadrature spaced edges of the wafer may be inserted as shown in FIGURES 17 and 20 for support of the wafer slightly above the surface of the plate 622. As is well understood, the generally circular shaped wafers are provided with a flat portion 676 (see FIGURE 17) along a line dependent upon the crystal structure of the wafer, which flat is inserted in the slot extending generally transversely of the machine.

When the drive motor for the slide 652 is energized for rotation in one direction, the slide 652 is drawn forward to a position wherein the wafer 38A is positioned directly above the chuck 312. The vacuum source is then connected to the chuck to draw the wafer 38A down into engagement with the chuck. The direction of rotation of the motor is then reversed to return the slide 652 to the illustrated retracted position. Switches 678 and 680 adjacent the rack 658 are actuated at the ends of the stroke of the slide for control of the chuck vacuum and wafer loading slide reversing circuit.

To accommodate wafers of different diameters the wafer carrying head 666 is adjustably positioned along the slide. As seen in FIGURES 17, 20, 21 and 22, the head 666 is attached to the slide by a screw 682 extending through an elongated slot 684 in the slide, which screw threadedly engages a tapped hole in the head. A pair of keys 686 engage cooperating grooves in the slide and head and which grooves extend parallel to the elongated hole 684. When the screw 682 is loosened the head 666 is movable along the slide in the direction of slot 684 whereby different diameter wafers are accommodated.

A typical substrate, or wafer, is about 6 to 8 mils thick. Wafers of greater thickness may be accommodated by replacing the head 666 with one in which the upper step of the recess 670 is of greater height to accept the thicker wafer.

After the wafer has been fed to the vacuum chuck, precisely aligned with the mask, and exposed to the ultraviolet light through the mask the wafer chuck is returned to the lower position, the vacuum at the chuck is released, and the wafer is pushed off the chuck and deposited back onto the tray 628 by the ejector slide 654. This slide, which is oriented at an acute angle with the loading slide 652, also comprises a rack 690 reciprocally mounted between ways 692 secured to the surface of the plate 500. A pinion 694 on a shaft of a motor engages the rack for drive actuation thereof when the motor is energized.

Figure 23:
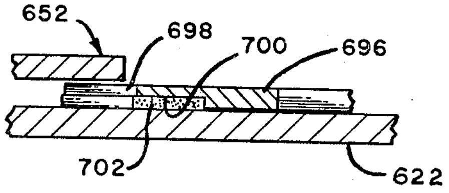
FIGURE 23 is an enlarged fragmentary cross sectional view taken along line 23—23 of FIGURE 17 and showing the wafer unloading head on the unloading side.
Figure 21:
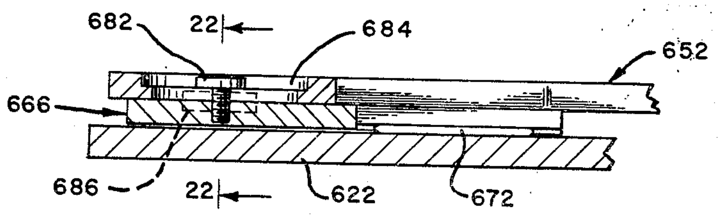
FIGURE 21 is an enlarged fragmentary cross sectional view taken along line 21—21 of FIGURE 17.

The forward end of the rack is provided with a pusher head 696 formed with a V-shaped notch 698 in the forward end thereof. As seen in FIGURES 17 and 23, a recess 700 is formed in the bottom of the head along the V-shaped groove, in which recess a pad 702 of flexible material, such as plastic, or like material, is mounted which engages the surface of the top plate 622. A pad of velvet material has been found to be satisfactory.

When the unloading slide motor is energized for rotation in one direction, the head 696 is driven forward beneath the slide 652, across the chuck plate 312 and stops at the inner end of the groove 638 in the plate 622. The wafer on the chuck is thereby swept, or brushed, off the chuck and redeposited on the tray 628. At the end of the forward stroke of the head 696 the motor is energized for rotation in the opposite direction to return the head to the illustrated retracted position.

During operation, when the wafer is removed from the recess (such as the recess 630A) and positioned in the loading slide 652, the tray 628 is manually rotated in a counterclockwise direction to place the now empty recess 630A in position at the end of the slot 638 to receive the exposed wafer in the same recess from which it was removed. The detent 640 releasably locks in the chamfered grooves 636 during initial rotation of the tray 628, and snaps into the unchamfered slot to prevent further rotation of the tray when the recess 630E is rotated into the position occupied by recess 630A in FIGURE 17. The last exposed wafer taken from recess 630E may be returned to the recess 630E by releasing the detent by pressing down upon push button 646 and rotating the tray to the next position.

The invention having been described in detail in accordance with the requirements of the patent statutes, various changes and modifications may suggest themselves to those skilled in this art, and it is intended that such changes and modifications shall fall within the spirit and scope of the invention as defined in the appended claims. Also, individual features of the illustrated apparatus are well adapted for use in other machines and devices such as wafer dicing machines, automatic probing machines, step and repeat cameras, bonding and welding machines, and the like, and are not limited to use with the illustrated apparatus.

I claim:

1. Alignment apparatus for use in aligning a mask and workpiece, or the like, comprising a base unit which includes, a mask holder for holding a mask, and a workpiece holder for holding a workpiece, an optical unit mounted on the base unit for viewing the mask and workpiece held by said mask and workpiece holders, means for moving the mask and workpiece holders together as a unit, and means for relatively moving the mask and workpiece holders in generally parallel planes to bring the mask and workpiece into desired alignment.

2. The apparatus as defined in claim 1 wherein said optical unit comprises, an ocular lens system, a rotatable turret having a plurality of turret positions, and at least one objective lens system on the turret alignable with the ocular lens system by rotation of the turret to one of the plurality of turret positions.

3. The apparatus as defined in claim 2 wherein said optical unit also includes, a source of exposure light for exposing a photosensitive film on the workpiece, and means on the turret for directing light from said exposure light source onto the workpiece through the mask in another position of the turret.

4. The apparatus as defined in claim 1 wherein said optical unit is movably mounted on the base unit for movement between operative and inoperative positions adjacent to and spaced from the mask holder, respectively, the mask holder being accessible for changing of masks when the optical unit is moved to the inoperative position.

5. The apparatus as defined in claim 4 wherein the optical unit is pivotally mounted on the base unit.

6. The apparatus as defined in claim 2 wherein the one objective lens system comprises a single field row and column objective for use when moving the mask and workpiece holder together, and at least one split field objective lens system is also on the turret and alignable with the ocular lens system for use when relatively moving the mask and workpiece during alignment.

7. The apparatus as defined in claim 2 wherein the ocular lens system remains stationary when the mask and workpiece holder are moved together and when they are relatively moved during alignment.

8. The apparatus as defined in claim 2 wherein the optical unit includes first and second split field objective lens systems at diagonally opposite sides of the turret, and first and second means for adjusting the separation of the optical axes of the first and second split field objective lens systems, respectively, said first and second adjusting means including manually operable members extending from diagonally opposite sides of the turret adjacent the second and first split field objective lens systems, respectively, for adjustment of the separation of the optical axes of the respective first and second split field objective lens systems.

9. The apparatus as defined in claim 1 wherein said optical unit comprises a source of light including illuminating rays for illuminating the workpiece and exposing rays for exposing a photosensitive film on the workpiece, an ocular lens system, a rotatable turret having a plurality of turret positions, at least one objective lens system on the turret alignable with the ocular lens system in one turret position, a filter movable into and out of the path of rays from the light source for filtering the exposing rays from the light source, means included in the objective lens system for directing filtered rays from the light source onto the workpiece to illuminate the same when the objective lens system is aligned with the ocular lens system, and means on said turret for directing unfiltered rays from the light source onto the workpiece to expose the photosensitive film thereon when the turret is rotated to another position.

10. The apparatus as defined in claim 9 wherein the one objective lens system comprises a split field system, said apparatus also including, a single field objective lens system at another position on the turret and alignable with the ocular lens system, a source of illumination which includes illuminating rays without exposing rays, means included in the single field objective lens system for directing the last-mentioned illumination source onto the workpiece when said single field objective lens system is aligned with the ocular lens system.

11. The apparatus as defined in claim 1 wherein said means for moving the mask and workpiece holders together comprises a first hand operated lever adapted for operation by one hand of an operator, and said means for relatively moving the mask and workpiece holders comprises a second hand operated lever adapted for operation by the other hand of the operator.

12. The apparatus as defined in claim 11 including releasable locking means for locking the mask holder against movement during relative movement of the mask and workpiece holders, and means on the first lever for releasing the locking means during operation of the first lever.

13. The apparatus as defined in claim 11 wherein said second hand operated lever is provided with first and second fulcrums selectively connected to the workpiece holder to provide said lever with first and second mechanical advantages for coarse and fine adjustment of the workpiece holder.

14. Adjustable mounting apparatus comprising, a base, a first platform mounted on the base and movable thereacross in any direction in a generally horizontal plane, a second platform mounted on the first platform and movable thereacross in any direction in a generally horizontal plane, first and second actuating devices for manually positioning said first and second platforms, said first actuating device comprising a first lever pivotally attached to the base, means connecting the lever to the first platform for movement thereof and the second platform carried thereby upon pivotal movement of said first lever, said second actuating device comprising a second lever, means for pivotally securing the second lever to one of the platforms, and means for connecting the second lever to the other of the platforms for relative movement of the first and second platforms upon pivotal movement of said second lever.

15. The mounting apparatus as defined in claim 14 wherein said means for pivotally securing the second lever to one of the platforms comprises, first and second fulcrums on said second lever, and means for selectively connecting said first and second fulcrums to said first platform to provide the second lever with different mechanical advantages for coarse and fine adjustment of the second platform relative to the first platform.

16. The mounting apparatus as defined in claim 14 including releasable locking means for locking the first platform to the base during operation of the second actuating device.

17. A lever operator having a selectable mechanical advantage comprising, first and second relatively movable members, a pivotable lever, first and second pivot means attached to said lever at a spaced distance apart, means selectively connecting the first and second pivot means to said first member for pivotal support of the lever about said first or second pivot means as selectable fulcrums, and means connecting the lever to said second member, the lever having first and second mechanical advantages when pivotally supported at said first and second pivot means, respectively.

18. The lever operator as defined in claim 17 wherein said first and second pivot means comprise ball and socket couplings attached to said lever at a spaced distance apart, and said means selectively connecting the first and second pivot means to said first member comprises first and second vacuum plates engaging the first member, and means selectively connecting the vacuum plates to a vacuum source to selectively secure the vacuum plates to the first member.

19. The lever operator as defined in claim 17 wherein said means connecting the lever to said second member comprises a gimbal which includes first and second gimbal rings one of which rings is secured to the lever and the other of which rings is secured to the second member.

20. A bearing arrangement for relatively movably mounting first and second members comprising, first and second pairs of rods, means attaching the rods to said first and second members in parallel spaced relation, and at least one ball between said first and second pairs of rods and rotatable therealong when said members are relatively moved, said rods being formed with at least a partially cylindrical-shaped surface along which the ball is adapted to roll.

21. The bearing arrangement as defined in claim 20 wherein the means attaching the rods to said first and second members comprises, pairs of abutment blocks attached to the first and second members in parallel spaced relation, and headed fasteners secured to the first and second members between the abutment blocks and engaging the rods to urge the same against the abutment blocks.

22. Aligning apparatus comprising, first and second generally horizontally movable platforms, a stationary base, means for mounting the first platform on the stationary base for movement in any horizontal direction thereon, means for mounting the second platform on the first platform for movement in any horizontal direction thereon, means for moving the first platform together with the second platform along the base, means for releasably locking one of the first and second platforms against movement while the other platform remains movable, and means for moving said other platform when the one platform is locked against movement.

23. The apparatus as defined in claim 22 wherein said means for mounting the first platform on the stationary base comprises, a first intermediate plate between said first platform and base, means for reciprocally mounting the first intermediate plate on the base, means for reciprocally mounting the first platform on the first intermediate plate for reciprocal movement in a direction at right angles to the direction of movement of the first intermediate plate on the base, a second intermediate plate between said first and second platforms, means for reciprocally mounting the second intermediate plate on the first platform, and means for reciprocally mounting the second platform on the second intermediate plate for reciprocal movement in a direction at right angles to the direction of movement of the second intermediate plate on said first platform.

24. The apparatus as defined in claim 22 wherein said means for moving the first platform together with the second platform along the base comprises, a generally upwardly extending first lever, means pivotally connecting the first lever to the stationary base for pivotal movement in any horizontal direction, means connecting the first lever to the first platform for movement thereof upon pivotal movement of said first lever, said means for moving said other platform with respect to said one platform comprising, a generally upwardly extending second lever, means pivotally connecting the second lever to the first platform, and means connecting the second lever to the second platform for movement thereof relative to the first platform upon pivotal movement of said second lever.

25. The apparatus as defined in claim 24 wherein said means connecting the second lever to the second platform comprises a gimbal which includes first and second pivotally connected gimbal rings.

26. The apparatus as defined in claim 24 wherein said means pivotally connecting the second lever to the first platform includes, a lever base plate fixedly secured to the first platform, first and second ball and socket means attached to the second lever, first and second vacuum plates affixed to the first and second ball and socket means, respectively, said first and second vacuum plates being formed with recessed bottom surfaces in engagement with the lever base plate, and means for selectively connecting the recesses in the vacuum plates to a vacuum source to selectively secure the vacuum plates to the lever base plate, one vacuum plate being secured to the lever base plate while the other is free to slide therealong.

27. Apparatus for use in aligning a mask and workpiece, or the like, comprising, a microscope, a holder for supporting a mask, a chuck for supporting a workpiece for viewing by the microscope through the mask, said chuck being movable to a retracted position for loading and unloading workpieces, and to an extended position wherein a surface of the chuck supported workpiece engages the mask, and stop means operable when retracting the chuck from the extended position for stopping the chuck at a position intermediate the retracted and extended positions, at which intermediate position the workpiece surface to be viewed is a predetermined spaced distance from the mask for different thickness workpieces.

28. The apparatus as defined in claim 27 wherein said stop means includes a releasable locking device which is secured to the chuck in the extended chuck position, and first and second stop members against which the locking device abuts in the extended and intermediate positions, respectively.

29. The apparatus as defined in claim 28 wherein at least one of the stop members is adjustably positioned for adjustment of the spacing therebetween and the spacing between the workpiece surface and mask in the intermediate position of the chuck.

30. A holding device or the like comprising, a support, a member reciprocally movably mounted on the support for movement between extended and retracted positions, and stop means for stopping the movable member at a position intermediate said extended and retracted positions, said stop means including, a releasable locking device operable in a locked condition for locking engagement with the movable member, a pair of spaced stop members attached to the support for engagement with the locking device and between which the locking device travels, means for moving the movable member to the extended position from the retracted position with the locking device in a released condition, and means for moving the movable member toward the retracted position from the extended position with the locking device in the locked condition for stopping the movable member at said intermediate position, said movable member being movable to the retracted position when the locking device is released.

31. The holding device as defined in claim 30 wherein at least one of the pair of stop members is adjustably positioned for adjustment of the spacing between the stop members.

32. Apparatus for use in aligning a mask and workpiece comprising.

a miscroscope, a mask holder for holding a mask, a generally horizontal plate formed with an aperture therethrough, a chuck with an upper face for the support of a workpiece for viewing by the microscope through a mask on the mask holder, means mounting the chuck for vertical movement between a lowered position wherein the chuck face is substantially even with the top of the horizontal plate, a raised position wherein a workpiece on the chuck face is held in face-to-face engagement with a mask held by the mask holder, and an intermediate position wherein the upper surface of the workpiece is positioned a spaced distance from the mask during alignment, a first loading slide movable across the horizontal plate for moving a workpiece onto the chuck, and a second slide movable across the horizontal plate at an angle with said first slide for moving a workpiece off the chuck.

33. The apparatus as defined in claim 32 wherein the first slide is provided with a slide head having a generally vertically extending wall, a blade extending from the wall at the botom thereof, and a recess in the head above the blade into which a workpiece may be inserted for support thereof above the horizontal plate.

34. The apparatus as defined in claim 32 including, a rotatable workpiece tray attached to the horizontal plate for carrying a plurality of workpieces adapted to be loaded onto the first loading slide, said workpieces being redeposited on the tray by the second slide.

35. Apparatus as in claim 1 wherein said optical unit comprises:

an ocular lens system;

a rotatable turret having a plurality of turret positions; and a plurality of objective lens systems mounted on said turret, each of said objective lens systems being alignable with the ocular lens system by rotation of the turret to a different one of the turret positions.

36. Apparatus as in claim 35 wherein:

said plurality of objective lens systems comprises at least a pair of split field objective lens systems; and said optical unit includes means for adjusting the separation of the optical axes of each of said split field objective lens systems.

37. Apparatus as in claim 35 wherein said plurality of objective lens systems comprises a single field row and column objective lens system and at least one split field objective lens system.

38. Apparatus as in claim 35 wherein said optical unit includes:

a source of exposure light for exposing a photosensitive film on the workpiece; and means mounted on said turret for directing light from said source of exposure light onto the workpiece through the mask in another of the turret positions.

39. Apparatus as in claim 1 wherein said optical unit comprises:

means for providing illuminating light to illuminate the workpiece and for providing exposure light to expose a photosensitive film on the workpiece;

an ocular lens system;

a rotatable turret having a plurality of turret positions;

at least one objective lens system mounted on the turret and alignable with the ocular lens system in one of the turret positions, said objective lens system including means for directing the illuminating light onto the workpiece to illuminate the workpiece when the objective lens system is aligned with the ocular lens system;

means mounted on said turret for directing the exposure light onto the workpiece to expose the photosensitive film thereon when the turret is rotated to another of the turret positions; and means movable into the path of the exposure light for preventing the exposure light from reaching the workpiece and movable out of the path of the exposure light for permitting the exposure light to reach the workpiece when the turret is rotated to said other of the turret positions.

40. Apparatus as in claim 11 including:

releasable locking means for locking one of said mask and workpiece holders against movement during relative movement of the mask and workpiece holders; and means for releasing said releasable locking means during operation of said first lever.

41. Apparatus as in claim 27 wherein said microscope comprises:

an ocular lens system;

a rotatable turret having a plurality of turret positions; and a plurality of objective lens systems mounted on said turret, each of said objective lens systems being alignable with the ocular lens system by rotation of the turret to a different one of the turret positions.

42. Apparatus as in claim 41 wherein:

said plurality of objective lens systems comprises at least a pair of split field objective lens systems; and said optical unit includes means for adjusting the separation of the optical axes of each of said split field objective lens systems.

43. Apparatus as in claim 41 wherein said plurality of objective lens systems comprises a single field row and column objective lens system and at least one split field objective lens system.

44. Apparatus as in claim 27 wherein said microscope comprises:

an ocular lens system;

a rotatable turret having a plurality of turret positions;

at least one objective lens system mounted on said turret and alignable with the ocular lens system in one of the turret positions; and means mounted on said turret for directing exposure light onto the workpiece through the mask in another of the turret positions.

45. Apparatus as in claim 27 including actuating means for moving one of said holder and chuck relative to the other, said actuating means including a lever having first and second fulcrums that may be selectively employed to provide first and second mechanical advantages for coarse and fine adjustment of said one of said holder and chuck.

46. Apparatus as in claim 27 including means for loading workpieces onto said chuck.

47. Apparatus as in claim 44 wherein said last-mentioned means comprises reciprocally movable slide means for loading workpieces onto said chuck and unloading workpieces from said chuck.

References Cited

UNITED STATES PATENTS

| | | | |
|---|---|---|---|
| 2,563,789 | 8/1951 | Kurtz et al. | |
| 2,910,913 | 11/1959 | Michel | 350—19 |
| 3,192,844 | 7/1965 | Szasz et al. | 95—73 |
| 3,220,331 | 11/1965 | Evans et al. | 95—73 |
| 3,334,541 | 8/1967 | Delp | 95—73 |

NORTON ANSHER, Primary Examiner

RICHARD L. MOSES, Assistant Examiner

U.S. Cl. X.R.

350—19

UNITED STATES PATENT OFFICE
CERTIFICATE OF CORRECTION

Patent No. 3,490,846 Dated January 20, 1970

Inventor(s) Goetz H. Kasper

It is certified that error appears in the above-identified patent and that said Letters Patent are hereby corrected as shown below:

Column 8, line 74, cancel "80" and insert -- 180 --;

Column 9, line 8, after "which" insert -- device --; line 67, after "split" insert -- field --;

Column 12, change the order of lines 11-18 to read as follows:

the mask is possible. In addition to being vertically movable, the vacuum chuck 312 is rotatable about the vertical, or Z axis, and is movable in a horizontal plane (along X and Y axes) to permit proper alignment of the wafer with respect to the mask. In addition, the novel mounting means also provides for movement of the chuck 312 and mask 40 together, as a unit, for the proper positioning thereof in the microscope field.

Column 12, line 56, cancel "thereof" and insert -- thereby --.

SIGNED AND SEALED

AUG 18 1970

(SEAL)
Attest:

Edward M. Fletcher, Jr.
Attesting Officer

WILLIAM E. SCHUYLER, JR.
Commissioner of Patents

FORM PO-1050 (10-69)
0-160010

USCOMM-DC 60376-P69
* U.S. GOVERNMENT PRINTING OFFICE : 1969 O—366-334